UNITED STATES PATENT OFFICE.

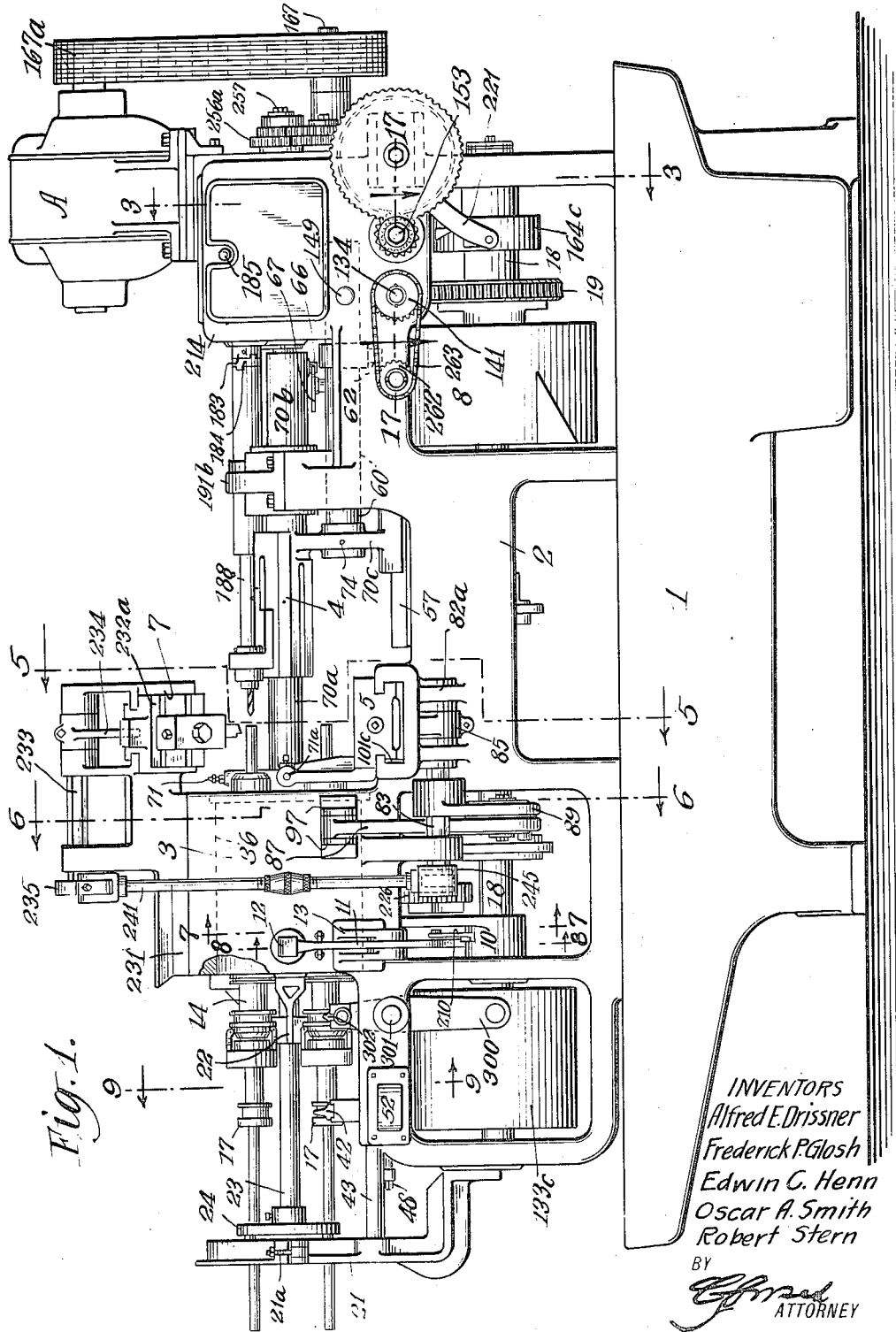

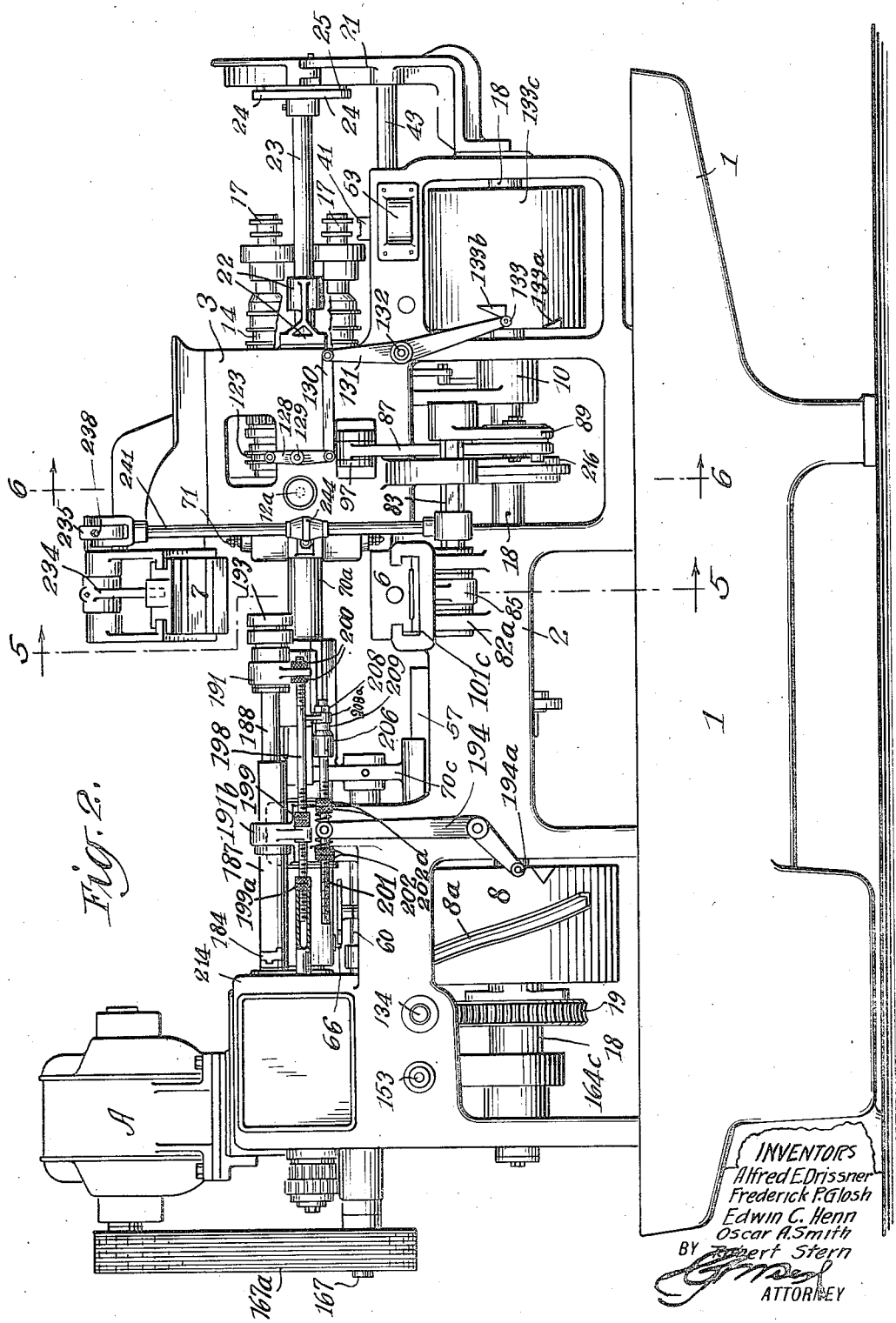

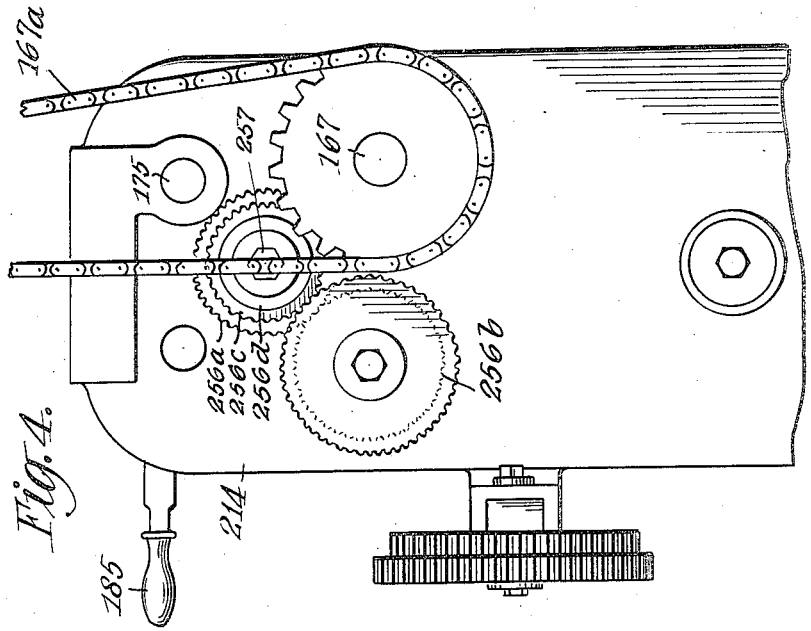
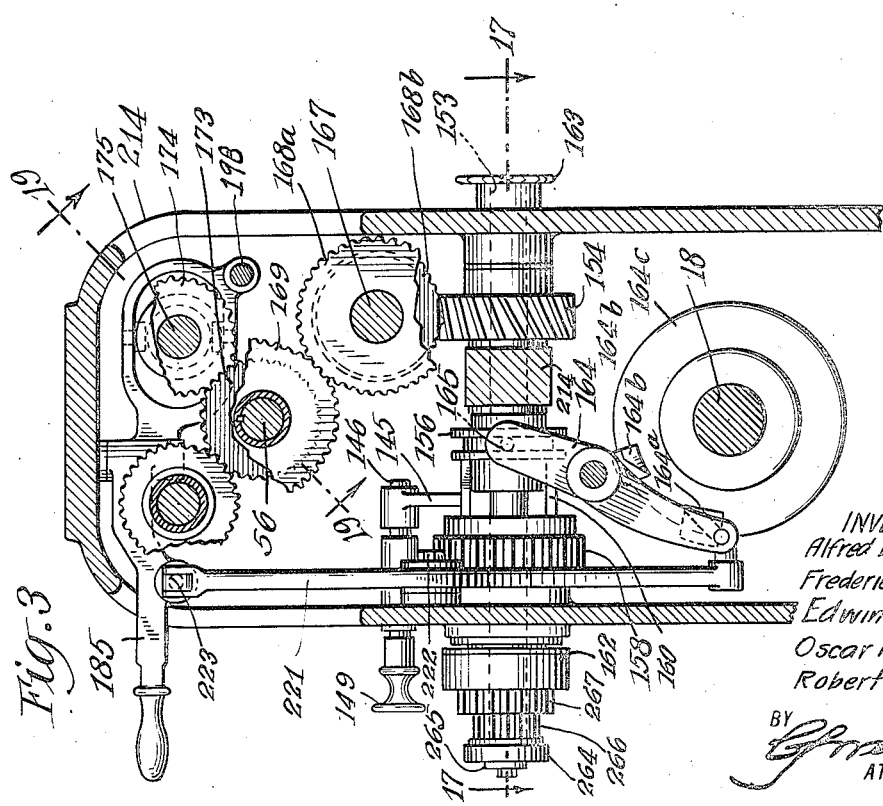

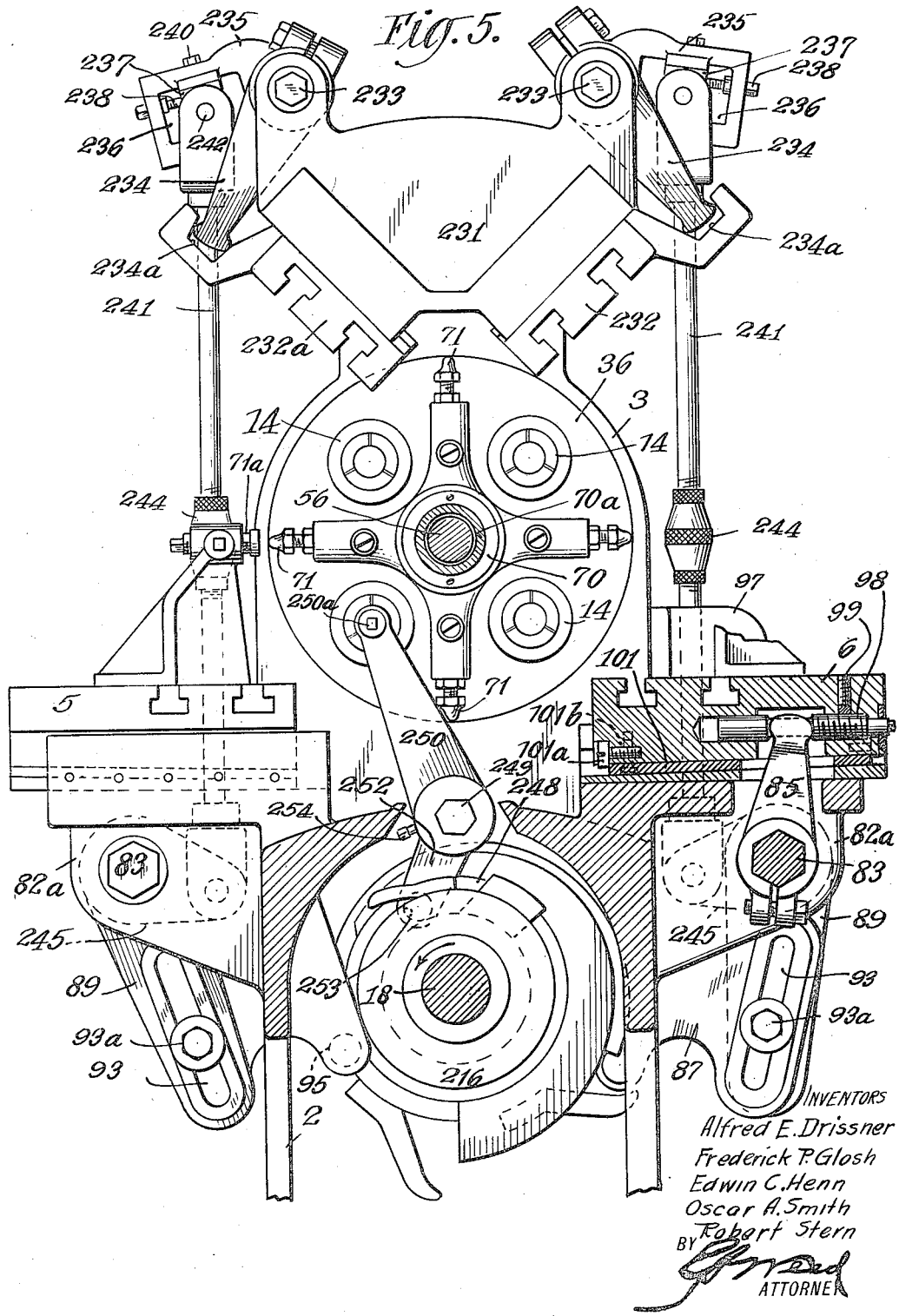

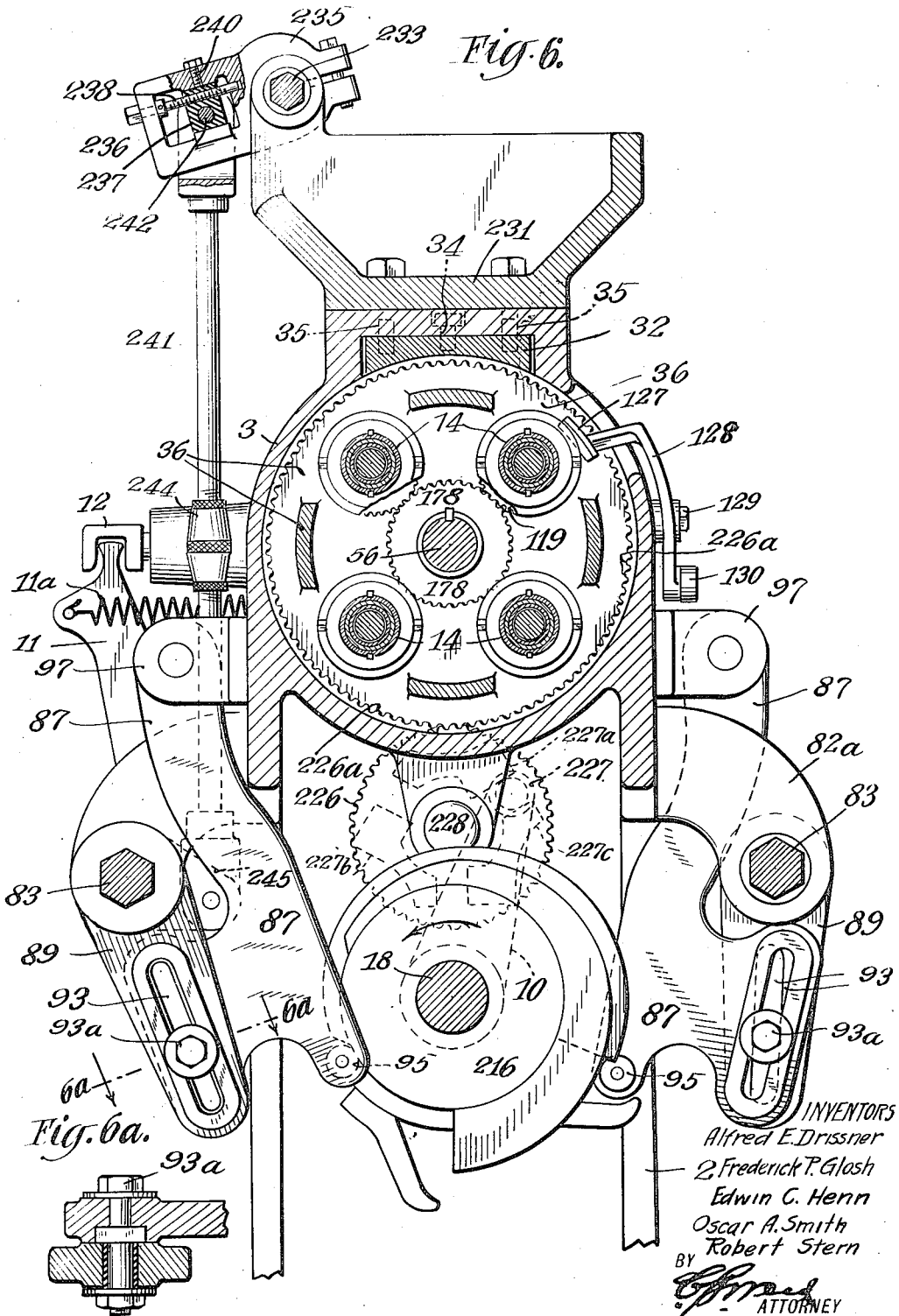

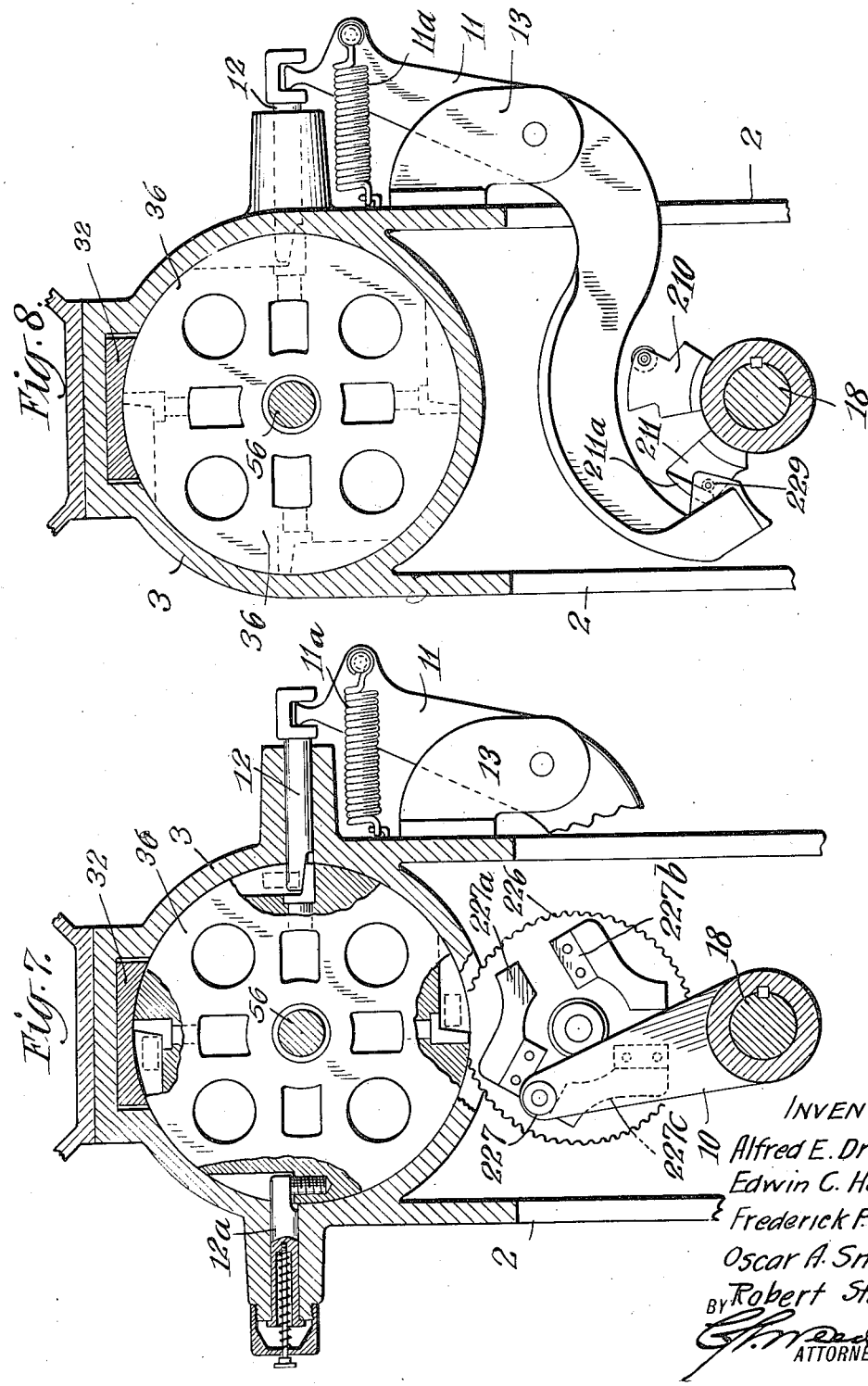

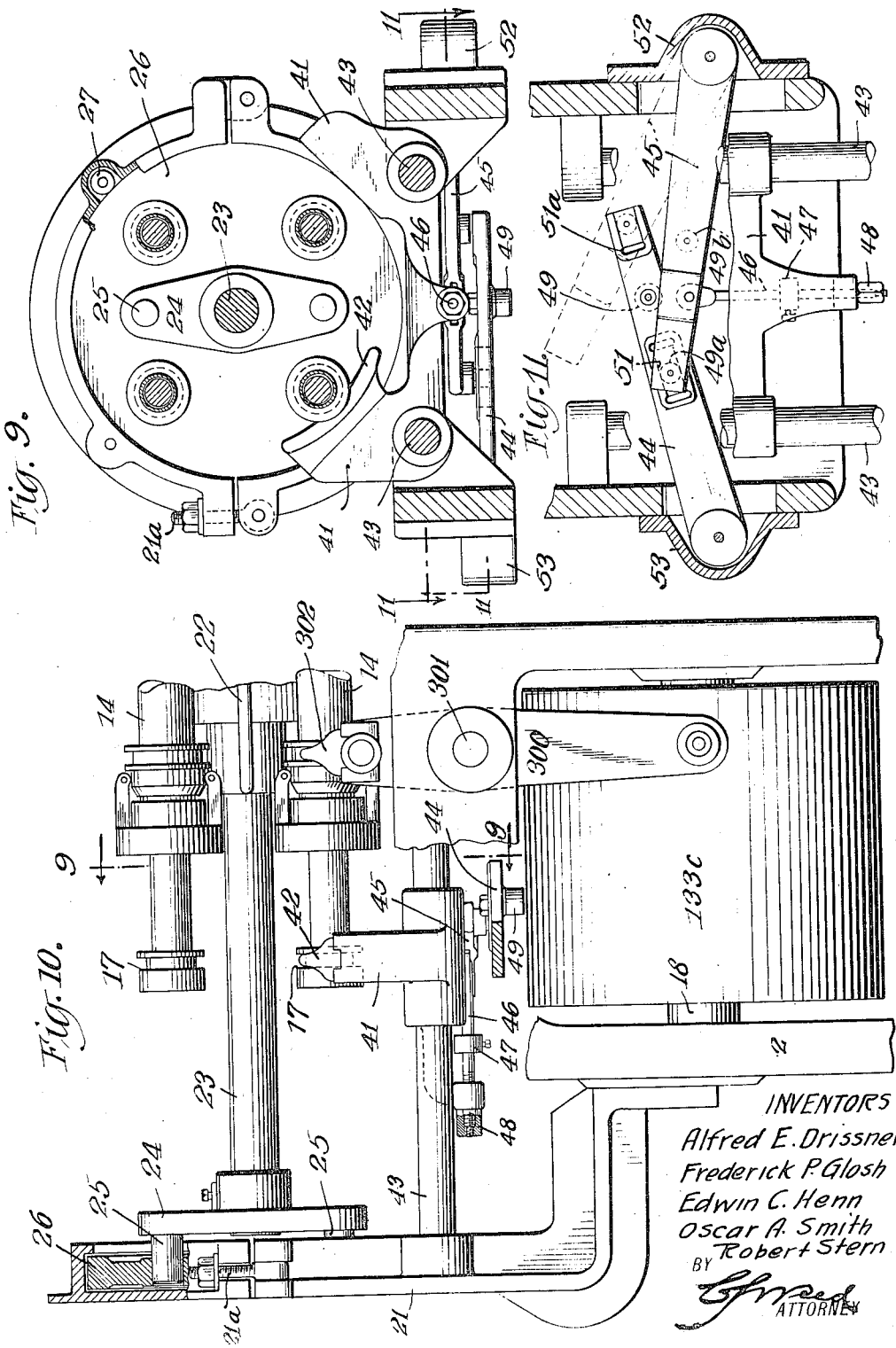

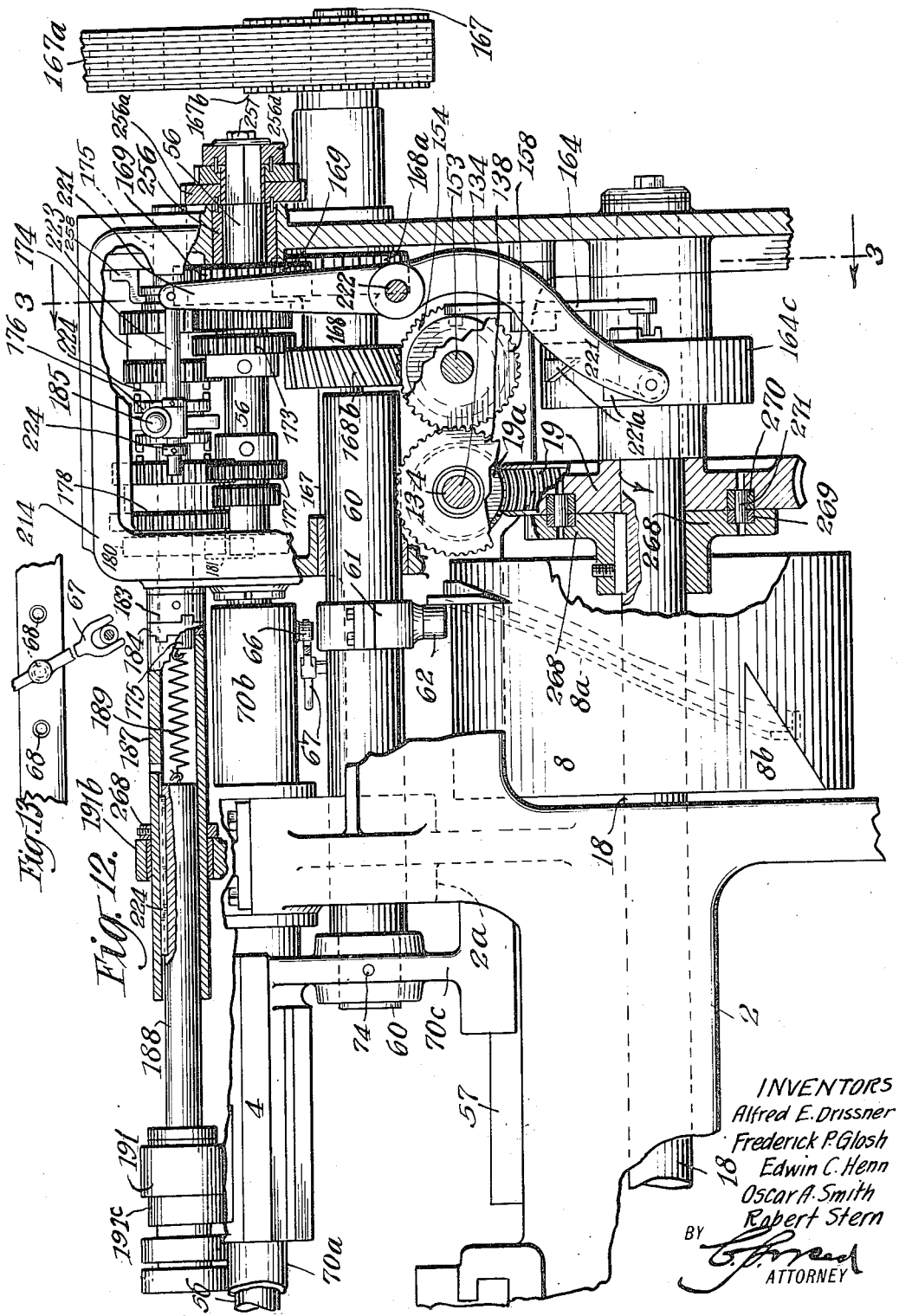

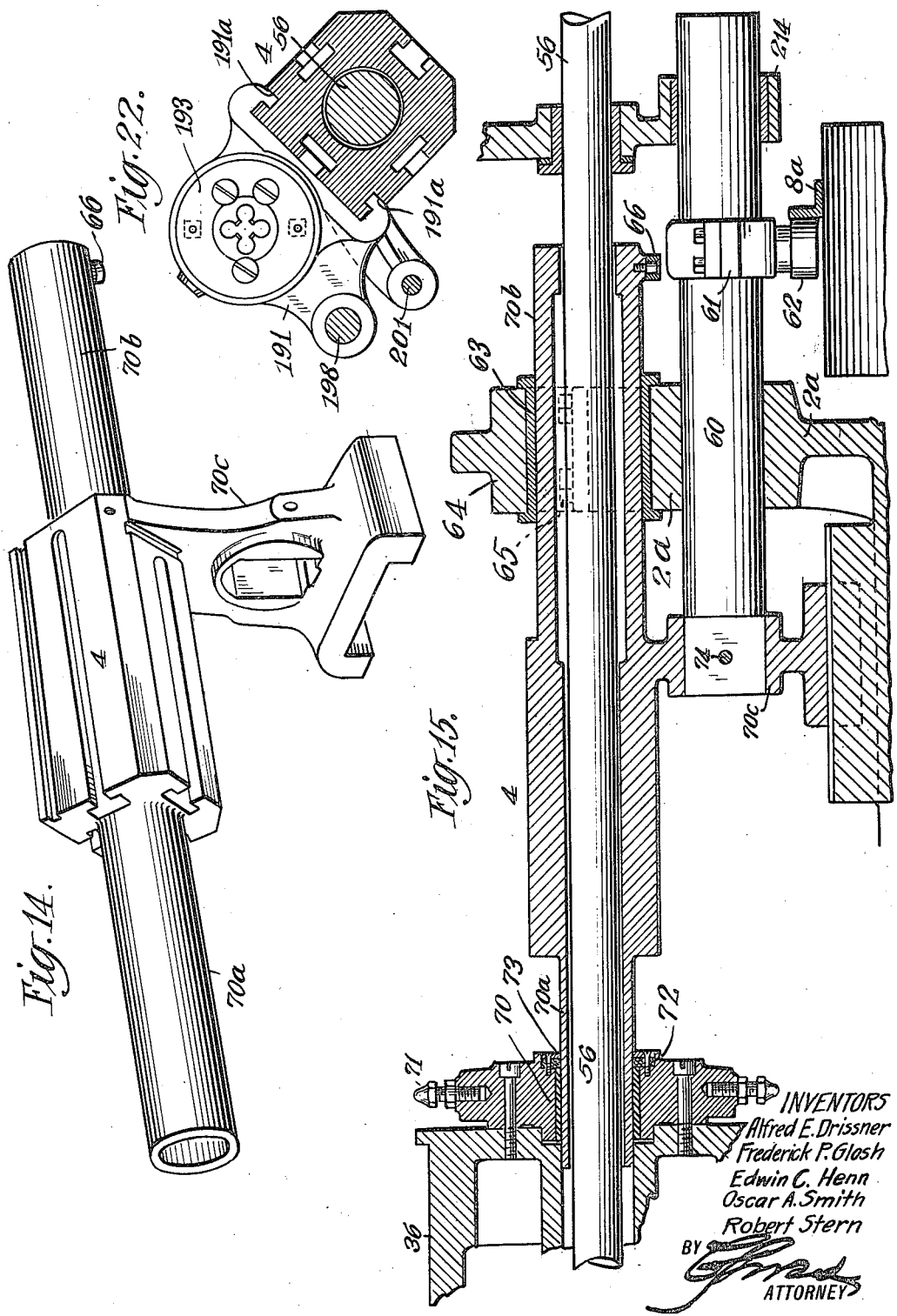

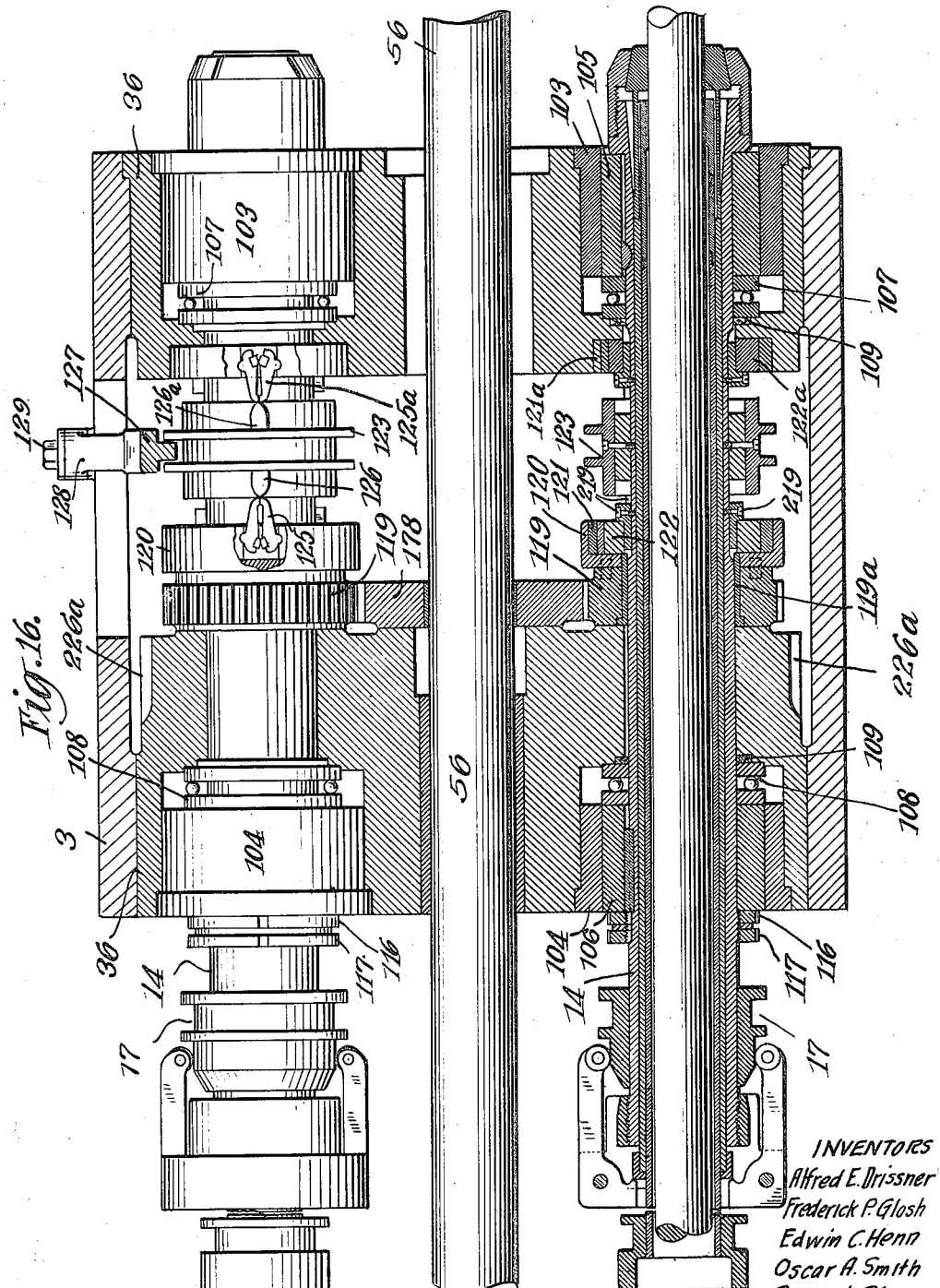

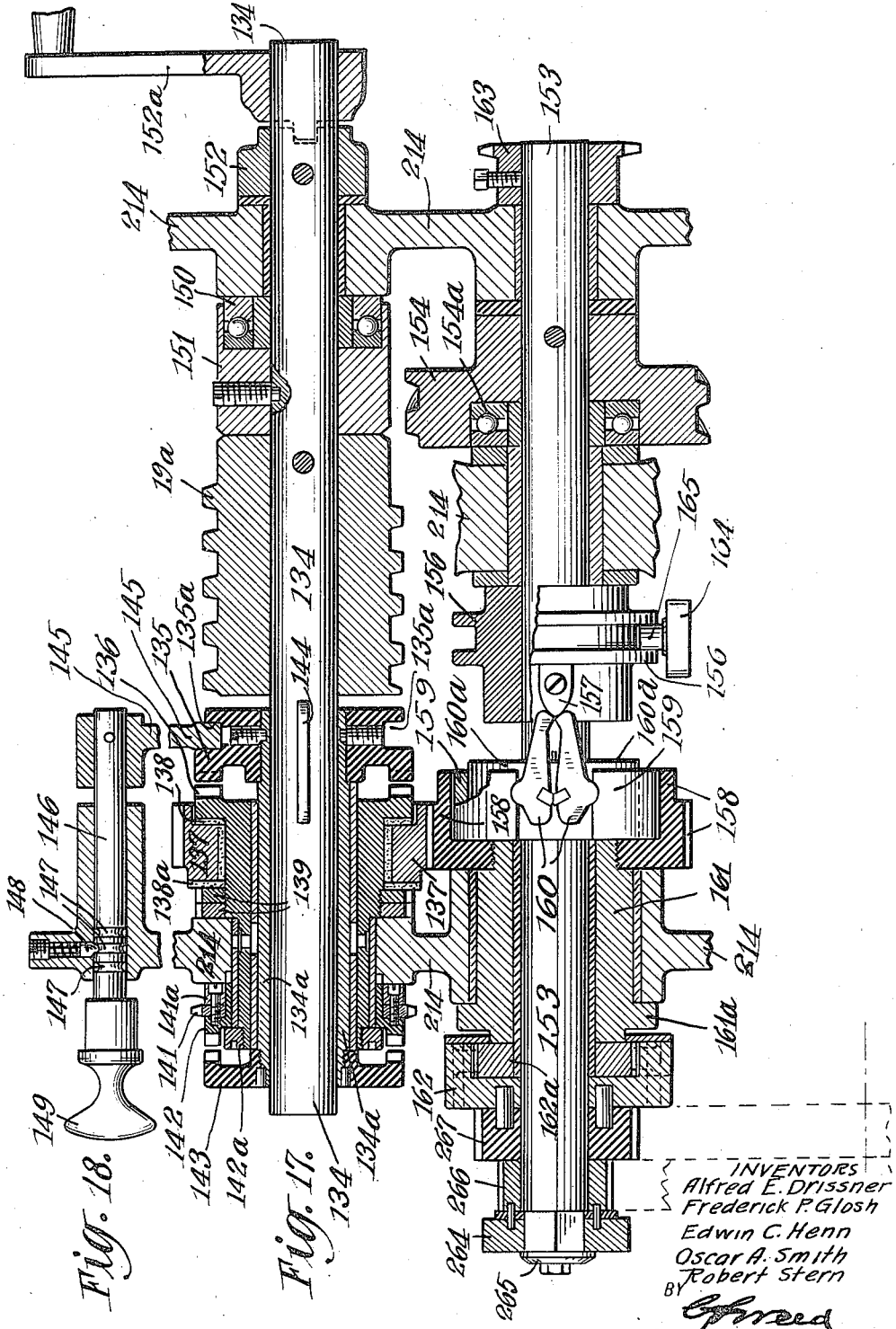

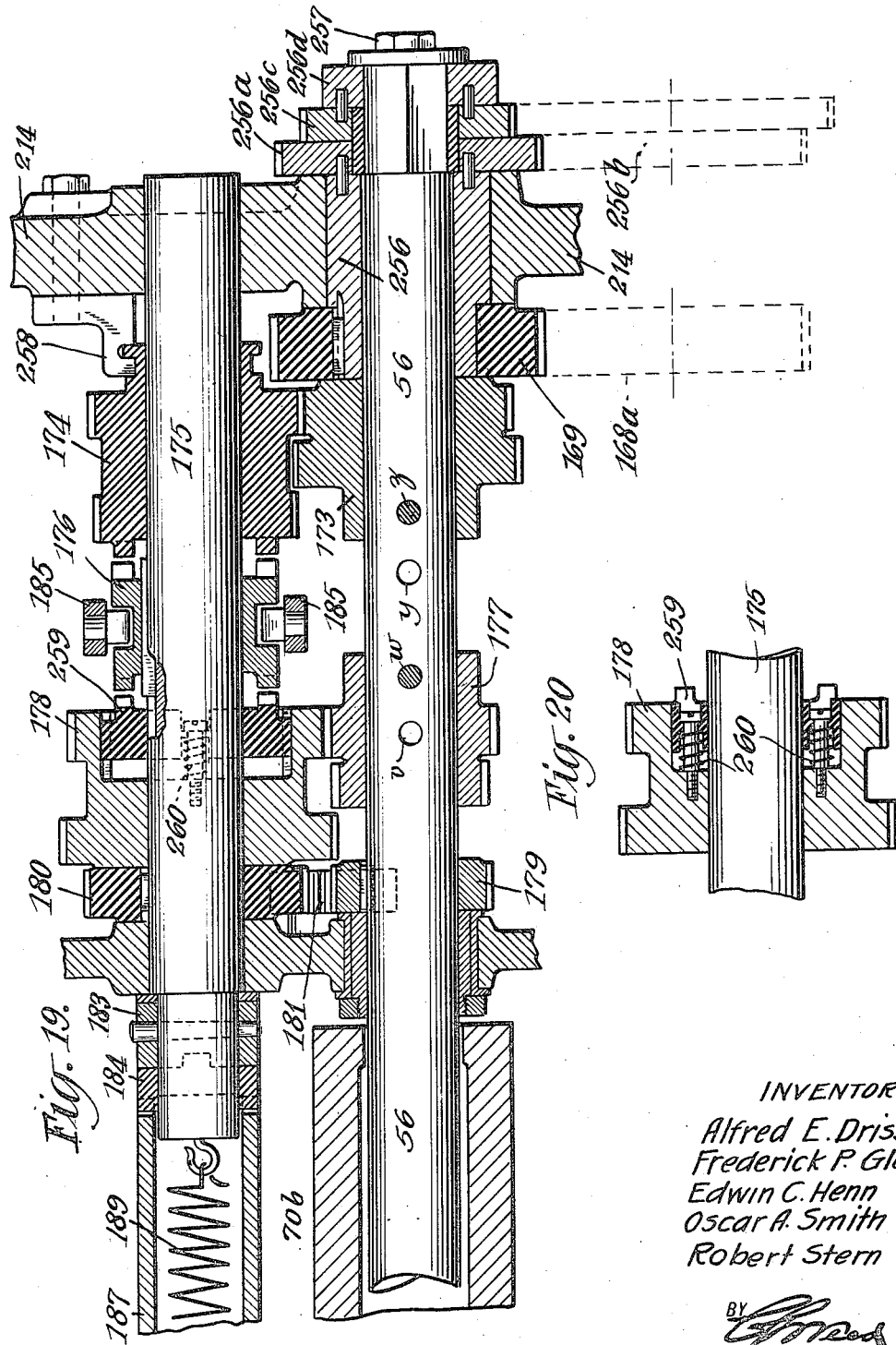

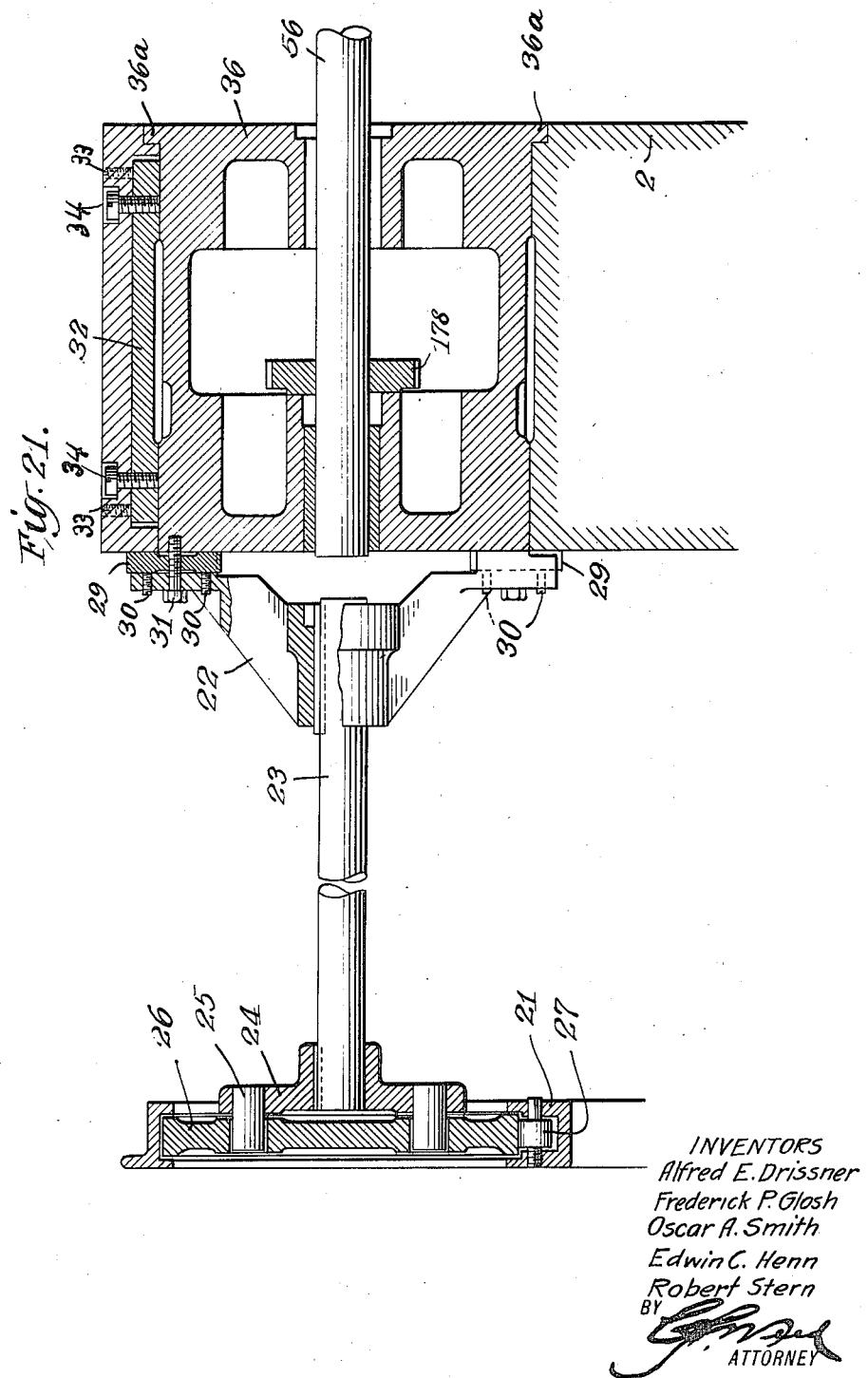

ALFRED E. DRISSNER, FREDERICK P. GLOSH, EDWIN C. HENN, OSCAR A. SMITH, AND ROBERT STERN, OF CLEVELAND, OHIO, ASSIGNORS TO THE NATIONAL-ACME COMPANY, OF CLEVELAND, OHIO, A CORPORATION OF OHIO.

AUTOMATIC MULTIPLE-SPINDLE SCREW-MACHINE.

1,320,609.      Specification of Letters Patent.      Patented Nov. 4, 1919.

Application filed January 22, 1917. Serial No. 143,812.

*To all whom it may concern:*

Be it known that we, ALFRED E. DRISSNER, FREDERICK P. GLOSH, EDWIN C. HENN, OSCAR A. SMITH, and ROBERT STERN, all citizens of the United States, excepting ALFRED E. DRISSNER, who at the filing of said application was a subject of the German Emperor, but who, however, had applied for naturalization as a citizen of the United States and still intends to become such citizen of the United States, residing at Cleveland, in the county of Cuyahoga and State of Ohio, have invented certain new and useful Improvements in Automatic Multiple-Spindle Screw-Machines, of which the following is a specification.

This invention relates to automatic multiple spindle screw machines for the machining of parts from bar stock, such as metal parts used in practically all the metal working industries, the object of the invention being to provide an improved machine of this class.

One of the main objects of the improvement is to provide an improved organization and construction of machine whereby the overhang and consequent vibration of the tools so frequent in machines of this general type, is avoided.

Another object of the invention is the provision of an improved main tool slide and method of supporting the same.

A further object of the invention is the provision of a machine wherein an improved means for operating the cross and top slides is provided so that this operating mechanism will be from under the cutting and forming slides so that the chips from the tools thereof will not interfere with such mechanism.

Another object of the invention is the provision of improved means for supporting the side or cross tool slides on ways integral with the bed and of improved mechanism for operating such slides, thereby doing away with the common form of knee-type tool slides and the consequent unsteady feeding of such slides and thus eliminate all strains and vibration.

A further object of the invention is the provision of an improved safety mechanism located in position to coöperate with the worm wheel on the cam shaft.

Various other important advantages and objects are obtained in the present improved machine which will appear throughout the specification, among which is the provision of a very fast and non-frictional and accurate cylinder-indexing mechanism; improved and powerful upper or top slides; an improved and adjustable means in connection with the lever mechanism for operating the forming, cut-off and top slides; whereby the necessity of changing the cams on the cam shaft for the different depths of cuts as heretofore necessary is avoided; an improved means for releasing and positively stopping the work spindles; an improved die spindle and mechanism for operating the same; an improved change gear driving, starting, stopping and control mechanism for the machine; an improved adjustable stock feeding mechanism; an improved cylinder; means for adjusting the cylinder in its casing to compensate for wear or tension; an improved auxiliary support for the cylinder; an improved positive locking means for the cylinder; improved means for taking up the end play of the cylinder in its casing, and an improved organization and construction of machine generally, wherein the bed and legs, the side arms and rear bearing for the cam shaft may be made in one single piece or integral to stiffen the machine and thereby make it more rigid.

In the drawings accompanying and forming part of this specification, Figure 1 is a side view of this improved multiple spindle screw machine; Fig. 2 is a side view from the opposite side thereof; Fig. 3 is a cross sectional view taken on line 3—3 of Figs. 1 and 12, looking in the direction of the arrows; Fig. 4 is a right hand end view of the machine looking in the direction of the arrows 3—3; Fig. 5 is a cross sectional view taken on line 5—5, Figs. 1 and 2 looking in the direction of the arrows; Fig. 6 is a cross sectional view taken on line 6—6, Figs. 1 and 2 looking in the direction of the arrows; Fig. 6$^a$ is a sectional view on line 6$^a$—6$^a$, Fig. 6; Fig. 7 is a cross sectional view taken approximately on line 7—7, Fig. 1, looking in the direction of the arrows, and illustrating the cylinder locked; Fig. 8 is a somewhat similar cross sectional view taken approximately on line 8—8, Fig. 1, looking in the direction of the arrows; Fig.

9 is a cross sectional view taken on line 9—9, Fig. 1, looking in the direction of the arrows; Fig. 10 is a side elevation of a portion of the left hand end of the machine shown in Fig. 1; Fig. 11 is a partly sectional horizontal view taken approximately on line 11—11, Fig. 9; Fig. 12 is a side elevation partly in section of the right hand end of the machine; Fig 13 is a detail view of the operating hand lever for setting the tool slide; Fig. 14 is a detail perspective view of the tool slide; Fig. 15 is a vertical sectional view of the tool slide and a portion of the bed of the machine illustrating the manner in which the tool slide is supported; Fig. 16 is a vertical sectional view of the work cylinder and the work-carrying spindles carried thereby; Fig. 17 is a horizontal cross sectional view taken on line 17—17, Figs. 1 and 3; Fig. 18 is a detail partly sectional view of the clutch shifter illustrated in Fig. 3, it being shown for purposes of illustration as shifted 90° from the plane of the section shown in Fig. 17; Fig. 19 is a sectional view taken on the diagonal line 19—19, Fig. 3; Fig. 20 is a detail of part of the mechanism shown in Fig. 19; Fig. 21 is a vertical sectional view of the work cylinder and the means for supporting the same and one form of reel connected therewith; and Fig. 22 is a cross sectional view of the main tool slide and the threading die spindle.

Similar characters of reference indicate corresponding parts in the several figures of the drawings.

Briefly, the present improvement includes a rotatable, intermittently operated work spindle cylinder, shown in the present instance carrying four work spindles, and means for indexing it intermittently, and a main tool-carrying slide movable toward and from the work cylinder and means for operating it, together with top and cross tool slides and means for operating them, and a threading die mechanism supported in an improved manner on the main tool slide, and while it will be understood of course that the various details may be more or less changed without departing from the spirit or scope of the claims, this improved machine in the preferred form thereof comprises a bed 2 having a pan 1, and which bed is provided with an upwardly extending bearing 3 forming a casing or housing for the work spindle cylinder 36 and at one end, the bed 2 is also provided with another upwardly extending bearing 214 in alinement with the first upright bearing 3, and this bearing 214 forms a housing for the driving mechanism and also the bearings for the other mechanisms to be hereinafter described.

The bed, the upwardly extending bearings 3 and 214 and other parts extending below to house the cams and other parts are all formed in the present improvement as an integral structure, thus providing a very rigid base or framework for the operating mechanisms.

The work cylinder 36 is located for intermittent rotation or indexing in the casing or housing 3 and is centrally bored to receive a spindle driving shaft 56, which in the present instance is driven from a motor A, shown mounted at the top of one end of the machine through suitable change gears hereinafter referred to. In some machines this motor will be mounted at one end of the machine near the base. Parallel with this cylinder bore and equally spaced at a suitable distance from the same are housed the rod or work spindles 14 shown herein as four. In the rear extended bearing 214 is a bore in line with the cylinder bore, and this bore is properly bushed to house the end of the spindle driving shaft 56. To the front face of the cylinder 36 for rotation therewith is suitably secured a tool slide supporting bearing 70 for slidably supporting one part or end of the main tool slide 4, and this part of the tool slide 4 is shown in the form of a tubular member or non-rotatable shaft 70$^a$. Projecting from the opposite or rear end of the tool slide 4 is a similar member or shaft 70$^b$. These shafts are shown rigidly or integrally connected with the tool slide 4. The tool slide 4 is of four-squared formation at angles of 45° and the sides thereof are provided with dovetail ways or grooves for the reception of the different end working tools, four grooves being shown herein. The tool slide 4 is centrally bored to correspond with the bore of the tubular shafts to allow the work spindle shaft 56 to pass therethrough with proper clearance, and the central bore of the cylinder is of course of sufficient diameter to permit the shaft 70$^a$ of the main tool slide 4 to slide therein. The shaft 70$^b$ is slidingly supported by an upright bearing 2$^a$ integral with the bed, and this bearing is provided with a proper bushing 63 and is held in place by a clamp cap 64 and bolts 65. The shaft portion 70$^b$ of the tool slide is of such length that when the tool slide 4 has been moved backward as far as possible from the work cylinder, it will not strike the housing 214. From the foregoing it will be seen that the forward end of the tool slide is slidingly supported by the tool slide supporting bearing 70, while the rear end thereof is supported in the upright bearing 2$^a$ of the bed. The bearing 70 for the end 70$^a$ of the tool slide is flanged so as to project into the front face of the cylinder 36 (see Fig. 15) the central bore of the cylinder being suitably bushed for the front end of the tool slide as hereinbefore stated, and in the bore of this bearing 70 there is located a piece of soft material or felt 72, which acts as a preventive to keep the chips from entering the bore of bearing 70, and this material is held in place by a suitable washer 73 and screws. This bearing 70 is provided with four arms, into which at their extreme ends are located adjusting screws 71, which coöperate with screws 71ª located in suitable brackets adjacent to the forming and cut-off slides hereinafter described, and these adjustable screws 71 and 71ª constitute stops for limiting the movement of the forming and cut-off slides in a manner which will be readily understood. Projecting from one end, as the rear end of the tool-carrying portion 4 of the tool slide, is a depending bracket 70ᶜ, which bracket is slidingly supported on the bed 2 of the machine by ways 57. A shaft 60 parallel with the main tool slide 4 has its forward end pivotally secured by means of a pin 74 in an opening of the bracket 70ᶜ, and this shaft 60 is supported by and slides in the bearing 2ª of the bed 2, and also in the upright bearing 214. The opening in the bracket 70ᶜ is broached square and the end of the shaft 60 is squared to fit the same but this squared portion of the shaft is machined small enough to allow it to rock vertically and shift or slide horizontally on the pin 74. The pin merely acts as a tie to hold it in position. This allows the shaft 60 to slide or have play longitudinally of the pin 74 and to oscillate vertically relative to the pin 74. Supported in the bed 2 parallel with the spindle driving shaft 56 and below the same, is the main cam shaft 18 and this cam shaft carries the different cams and gears for operating the several parts of the machine hereinafter described. Bolted to the supplemental tool slide shaft 60 is a split collar 61, which is housed in a groove of the shaft 60, and this collar has secured thereto at its lower end a roller 62, which is in position to contact with the lead cam 8ª on the cam drum 8, and the usual take-back cam 8ᵇ on the same drum carried by the main cam shaft 18. From the foregoing it will be observed that the tool slide 4 is supported at its front end within the bearing 70 secured to the rotatable cylinder 36 and at its rear end in an upright bearing 2ª of the bed of the machine, and also supported by the bracket 70ᶜ on the ways 57 of the bed and by having the supplemental shaft 60, likewise supported in the bearings 2ª and 214, and which has, as stated, a pivotal connection with the bracket 70ᶜ of the tool slide, this tool slide will be operated without any perceptible deflection of the same, because the strain of the cams on the cam drum 8 against the roller 62 will be taken up by the bearings 2ª and 214 carrying the supplemental shaft 60 and will not be transferred to the slide 4 itself by reason of the play of shaft 60 relatively to bracket 70ᶜ, and this constitutes a very important improvement in this type of machines. For the purpose of shifting the tool slide back and forth by hand, as when setting the tools, a lever 67 is provided (see Figs. 12 and 13), one end of which is crotched to receive a stud 66 on the rear end of the tool slide, and this lever 67 may be pivotally supported in any one of several stations or openings 68, three of which are shown, located in the top of the bed a suitable distance away from the slide.

As hereinbefore stated, the cylinder 36 is housed in the upright bearing or casing 3 for intermittent rotation. To the rear of this cylinder for rotation therewith, is bolted a spider-formed disk 22 (see Fig. 21) having four arms branching from a center hub, and the hub has fastened thereto one end of a shaft 23. To the opposite end of this shaft is fastened a reel disk 24 carrying two oppositely located pins 25 for driving the reel disk 26. This reel disk 26 (see Figs. 10 and 21) has four bored holes therein to receive the stock rods. These holes are in exact alinement and circular spacing with the work spindles of the cylinder 36, and this reel disk also has two holes in alinement with the reel-driving pins 25. The reel disk 26 is supported on four rollers 27 equally spaced in a reel-supporting bracket 21 (see Figs. 10 and 21). The purpose of this construction is to support the rotating work cylinder at the rear thereof and independently of its casing 3, especially when the stock bars are long, and in various sizes of machines the reel and its bracket support will somewhat differ, although the purpose and general operation thereof is substantially the same. In one form, for instance, the bracket 21 for supporting the reel may be bolted to the bed, while in another form, and as shown herein, it is integral with the bed and is formed of a pair of hinged members connected by a clamping bolt 21ª (see Fig. 10), thereby to permit the proper assembly of the reel disk and bracket. In some forms of machines the shaft 23 may be directly fastened to the reel disk, and the reel support bracket 21 may be entirely omitted and the reel merely supported on the rollers 27 hereinbefore described, carried by suitable brackets that are fastened to the frame of the machine. Whatever the construction may be according to the different types of machine, the object is the same, viz: the support of the cylinder in the rear of the casing and the rotation of the stock reel with the cylinder other than by means of the stock or rods passing therethrough as heretofore, since in the present instance the reel is rotated through the medium of the shaft 23 secured to the hub 22 bolted to the cylinder. The work cylinder 36 is provided at its forward end with a circumferential flange 36ª, and which flange fits into a circumferential recess of the cylinder housing or casing 3. This cylinder is so constructed that it has a bearing portion at each end within the housing 3 and is provided approximately midway thereof with a chamber, opening at intervals to the exterior of the cylinder, and in this chamber are placed certain of the driving gears hereinafter referred to.

At the outer ends of two opposite arms of the cylinder support spider 22 (see Fig. 21) are milled two grooves at right angles to the center bore of the cylinder. Into these grooves are fitted two bronze plates or shoes 29 known as cylinder end tension blocks. Bolts 31 clamp these shoes 29 firmly in the grooves. Two adjusting screws 30 are carried by each arm of the spider and contact with the surface of its shoe. By loosening the bolt 31 and screwing the adjusting screws 30 forward and then tightening the bolt 31, endwise play of the cylinder in the casing will be taken up. To increase this endwise play the reverse of the foregoing operation takes place, viz: The bolt 31 is loosened and the screws 30 unscrewed, whereby the bolt 31 is again tightened. This operation will relieve or give more play to the cylinder endwise. The upper portion of the housing or bearing 3 for the cylinder 36 is machined to receive a cylinder tension shoe 32 (see Figs. 6 and 21). This shoe is machined to fit the periphery of the cylinder 36 on the top thereof. Two binding screws 34 clamp the shoe in place and four guide pins 35 act as guides to prevent the shifting of the shoe. Four adjusting screws 33 are provided for the adjustment of the shoe. To obtain the proper tension on the cylinder the two binding screws 34 are loosened and the four adjusting screws 33 are adjusted against the plate or shoe to the required tension, whereupon the clamping or binding screws 34 are then tightened to hold the adjustment. The guide pins 35 hold the shoe against movement during such adjustment. For rotating the cylinder intermittently or indexing it, the mechanism varies somewhat in the different types and sizes of the machine, but the mechanism illustrated herein (see Figs. 6 and 7) comprises the following elements:

The periphery of the cylinder 36 at a suitable distance from the ends thereof is milled to provide gear teeth 226ª. In that part of the bed 2 of the machine directly under the cylinder is located a stud 228. On this stud is located index gear 226, this gear being properly bushed so as to freely rotate on the stud. This index gear 226 meshes with the gear teeth 226ª on the cylinder 36. To the main cam shaft 18 is keyed and bolted the index lever 10 (see also Fig. 1). The free end of this index lever is provided with a stud and roller 227. To the side face of index gear 226 are bolted the desired number of lugs or stations, in this instance three, 227ª, 227ᵇ and 227ᶜ. The roller 227 on the end of the index lever 10, when the lever is rotated by the cam drum, comes successively into contact with the lugs or stations of the index gear 226 and thus rotates through the said index gear, the cylinder 36, from one station to the other or a ¼ distance. After each rotation of the cylinder a ¼ distance, the index lever frees itself from engagement with the index gear. In some instances the stations 227ª, 227ᵇ and 227ᶜ will be carried by a gear other than the index gear 226, so that the gearing may be compounded if desired, but the rotation of the cylinder, whether the gearing be compounded or is constructed in the simple maner described, is the same.

For locking the cylinder when indexed, the cylinder casing 3 is shown on opposite sides thereof provided with a pair of extended bearings (see Figs. 7 and 8), into which are housed on one side a lock bolt 12 and on the other side beveled latch or adjusting bolt 12ª. Suitable recesses or stations, shown as four in number, are machined on the periphery of the cylinder to register at the proper time with these lock and latch bolts. The outer end of the lock bolt 12 is crotched for the reception of the upper end of the lever 11 pivotally mounted on the bracket 13 carried on the bed of the machine, and this lever 11 is spring-connected as at 11ª with the bed of the machine. To the lower end of the lever 11 is secured a stud and roller 229 and secured to the cam shaft 18 are cams 210 and 211. When the cylinder is indexed and has been locked by its lock bolt, the wedge formed laterally projecting cam flange 211ª will then be resting against the roller 229 on the end of the lever 11, thus holding the lock bolt tightly in place and also putting pressure against the latch bolt 12ª, and so insure the perfect registering of the cylinder. This cam however, is only intended to hold the lock-bolt until the tool starts cutting. This is to insure a perfect registering of the cylinder before the tools start cutting. Where this cam is not used there is the possibility that the work turret or cylinder is not in exact proper position when the tools start to cut and if the tools do not force the cylinder into correct position the result would be breakage of the tools or imperfect work. At the proper time, during the rotation of the cam shaft 18, the lever 11 will be operated to withdraw the lock bolt and permit the cylinder to be indexed, the spring-pressed latch 12ª being automatically freed from the cylinder by the rotation of the cylinder.

In the present improvement, the cam 210 forms the releasing cam for shifting the lever 11 against the action of its spring, thereby to release the locking bolt 12, while the cam 211 forms a positive locking cam and by means of its flange or hook portion 211ª not only forces the lever 11 into position to maintain the bolt 12 in its locking position, but holds it there, thus eliminating all chance of the cylinder not setting squarely on the latch bolt 12ª. This is a very important feature, especially in large machines where the cylinder is heavy and where it takes considerable power to set the cylinder on the latch bolt.

In some instances the machine will be operated by power other than electric power, and in those cases the power will be transmitted by a belt to a pulley mounted on the end of pulley shaft 167. In the present instance, as hereinbefore stated, the machine is shown as motor-driven, the motor being connected by a suitable chain belt 167ª with a chain sprocket 167ᵇ secured to the end of the pulley shaft 167 (see for instance Figs. 1, 2 and 12), and this pulley shaft is supported in suitable extended bearings of the housing or bearing 214. Fastened to the pulley shaft 167 is a twin gear 168. One end of this twin gear is formed as a spur gear 168ª, while the other end thereof is formed as a spiral gear 168ᵇ. Spur gear 168ª meshes with a spur gear 169, which is keyed to a sleeve 256 (see Fig. 19) loosely mounted on the spindle driving shaft 56. This sleeve 256 is fastened to one, as 256ª, of a set of change gears and this set of gears through the companion gears 256ᵇ of the set of change gears transmits its power to change gear 256ᶜ. The gears 256ª and 256ᶜ are mounted for free rotation on a square bored sleeve bushing and change gear 256ᶜ is fastened to a square bored collar 256ᵈ held in place on the spindle driving shaft 56 by a washer and bolt 257, and by this means the spindle driving shaft 56 is rotated and therefrom the four work spindles located in the work cylinder 136 are rotated, and for this purpose the shaft 56 is provided with a gear 178 at its opposite end (see Fig. 6), which meshes with gears 119, one carried by each of the spindle shafts 14, which set of gearing is within the cylinder 36. By the means described an unbroken drive is imparted to the work spindles from the pulley shaft 167. Located in a bearing of the housing 214, below and at right angles with the pulley shaft 167, is shaft 153, on which is fastened a spiral gear 154 meshing with the spiral gear 168ᵇ. The worm gear shaft 134 is supported parallel with this shaft 153 and carried by this worm shaft in the manner hereinafter described is a spur gear 137 in mesh with a cup-formed spur gear 158 mounted on the shaft 153, and carried by the worm shaft 134 is a worm 19ª in mesh with a worm wheel 19 loosely mounted on the cam shaft 18, whereby power is transmitted from the main source of power in the manner described, to the worm wheel 19 on cam shaft 18, which is secured to the cam shaft in the following manner, whereby the cam shaft, through the means already and also hereinafter described is effective to operate the several mechanisms of the machine.

Keyed to the cam shaft 18 by means of a suitable bolt in juxtaposition to the worm wheel 19 is a disk 268, and in this disk 268 and worm wheel 19 are located hardened alined bushings 269 and 270. These bushings are connected by suitable pins 271, each extending partly into a bushing of the disk 268 and partly into the bushing of the worm wheel 19. The diameter of these pins 271 is arrived at by determining the power it takes to operate all the different mechanisms that are operated by the cams and disks on the cam shaft and the power it takes to operate all the tools in the tool slide, top slide and cut-off and forming slide. These pins are therefore just large enough to drive the cam shaft and when something unforeseen happens, such as a tool breaking or a cam catching, thereby putting an extra strain on the cam shaft, these pins will break or shear, allowing the worm to run loosely on the cam shaft 18, whereupon the operator will immediately know that something is wrong and after finding and correcting the cause, the broken pins are removed by sliding the disk 268 away from the face of the worm wheel 19, and inserting new pins and replacing the disk in its proper position. This safety device is one of the very important improvements in the present machine. In fact, in prior machines of the National-Acme Company safety devices have been used in various places, such as on the worm shafts, but all have been more or less of a failure because they have been located in the train of power beyond the worm wheel, but by placing the safety device in the manner shown in the present improvement, the direct strain is obtained thereon without any back gearing or ratio of power to multiply that strain which is the case where the safety device is in the train somewhere beyond the worm wheel, and so far as we are aware, this is the first time that a safety device has ever been placed to coöperate directly with the worm wheel, and from practical experience in the running of these machines it has been demonstrated that this improved safety device has effected a tremendous saving in the breakage of parts, especially in the larger type machines.

Referring now to the construction of the worm shaft 134 and the shaft 153 designated herein as the friction shaft (see Figs. 3, 12, 17 and 18), the worm shaft 134 has keyed at one end thereof a sliding sleeve 134ª which is housed partly inside of bearing 214 and partly outside thereof. Fastened to one end thereof, inside of the bearing 214 by set screws is clutch member 135. At the opposite end of the sleeve, and outside of the bearing 214 is fastened another clutch member 143. Between clutch member 135 and the face of bearing 214 is mounted clutch member 136, said clutch member having a part or sleeve thereof extending through the bore of the bearing 214. Secured to the sleeve of this clutch member 136, outside of the bearing 214, is clutch member 142, this clutch member having a suitable bronze bushing extending into the bearing 214. The several clutch members have suitable forms of clutch teeth. Secured to and properly bronzed bushed on clutch member 136 is the spur gear 137, which is in mesh with the friction cup-formed gear 158 connected with shaft 153 in a manner hereinafter described. Between gear 137 and a flange of clutch member 136 is a fiber washer 138, and to the threaded opposite end of clutch member 136 are secured tension collars or washers 139, and between these washers and clutch member 137 is a fiber washer 138a. Mounted on clutch member 142 is chain sprocket 141, and between the inner face of this sprocket 141 and resting against the outer face of bearing 214 is a binding collar 141a, which is bolted through chain sprocket 141 to clutch member 142. On the threaded end of the sleeve of clutch member 136 is adjusting nut 142a, a suitable fiber washer being usually located between it and a portion of the sleeve. Fitting in a suitable groove 135a of clutch member 135 is a fork 145, and to the upper end of this fork and supported by the bearing 214 is secured a rod 146 having a handle 149 on the end thereof. Located in the bearing 214 at right angles to this rod 146 is a suitable spring pressed plunger 148 and in the periphery of the rod 146 are machined three grooves 147 in position to register with the spring pressed plunger 148 according to the shifting of the rod 146. Carried by the shaft 134 as hereinbefore described back of the clutch members just described, is the worm 19a, which meshes with the worm wheel 19 carried by the cam shaft 18. Against one face of this worm 19a and secured to the worm shaft 134 is thrust bearing collar 151, and housed in the face of this collar is a thrust bearing 150, this bearing being of the usual thrust ball bearing type and this thrust ball bearing rests against a part of the bearing 214. Secured on the end of the worm shaft 134 outside of the bearing 214 is a clutch member 152 adapted to be rotated by a hand lever 152a when placed on the end of the shaft 134. The gear 158 on shaft 153 rotates gear 137 secured to the clutch member 136, and thereby rotates this clutch member 136 on sleeve 134a. When the clutch member 135 pinned to sleeve 134a, which latter is keyed by key 144 to worm shaft 134, is shifted by the handle 149 and its rod 146 to mate with clutch 136, the shaft 134 will be rotated automatically. When the intermediate groove 147 of the rod 146 is in engagement with the plunger 148, neither of the two sets of clutches is engaged. Therefore when this rod 146 is shifted to disengage the clutch members 135 and 136, the automatic drive of the machine is discontinued, and when the rod 146 is further shifted to engage the clutch members 142 and 143, which of course takes place by the shifting of the sleeve 134a, the turning of the shaft 134 by the hand crank 152a will operate the machine manually instead of automatically. This hand operation of the machine is used while the spindles are running and the work is revolving, and it is necessary to feed the tools to the work by hand, as is the case when setting up the machine or adjusting the tools.

The sprocket 141 (see Figs. 1 and 17) is connected by a sprocket chain 263 with another sprocket 262 mounted on a stud carried by the side of the bed 2. The outer face of this sprocket has a groove milled across it and the handle 152a hereinbefore referred to can also be used in connection with this grooved sprocket 262, whereby shaft 134 may likewise be turned by hand from this side of the machine.

As hereinbefore stated, the friction shaft 153 carries secured thereto the spiral gear 154, which meshes with the spiral gear 168b formed as a part of the twin gear 168 hereinbefore described, and by means of which power is transmitted from the motor through the supplemental shaft 167 to this friction shaft 153. This spiral gear 154 is pinned to the shaft 153 in such a position thereon that it is located between portions of the bearing 214, and between one part thereof and the spiral gear 154 is located a ball thrust bearing 154a similar to ball thrust bearing 150 hereinbefore described. The cup gear 158 meshing with the gear 137 as hereinbefore described is secured to a sleeve 161 extending through a bore of the bearing 214, and this sleeve is loosely mounted on the shaft 153, it having a flange 161a bearing on the outer face of the bearing 214. To the outer end of this sleeve is fastened by means of a key, a portion of a ratchet clutch 162a; the other member thereof 162 being secured to one as 267 of a pair of change gears. The other change gear 266 of the pair is secured to a collar 264 having a squared bore to fit on the squared end of the friction shaft 153, it being held in position by means of a suitable bolt and washer 265. The change gears 266 and 267 are in mesh with mating gears mounted on a stub shaft. Keyed on the shaft 153 to slide thereon is friction operating clutch spool 156, and within the cup gear 158 is located a friction ring 159, and keyed to the shaft 153 is a friction member 160ª, and carried by this friction member 160ª and working in suitable grooves of the friction ring 159 are friction operating fingers 160 in position to coöperate with a dog 157 of the clutch spool 156. A roller 165 projects into the groove of the spool 156 and this roller is carried by a stud on the end of a lever 164 pivotally mounted to the bed 2. This lever (see also Fig. 3) has at its lower end a stud and roller adapted to contact with suitable cams 164ª and 164ᵇ of a cam disk 164ᶜ, on cam shaft 18. By this mechanism the fast and slow speeds of the cam shaft are obtained. When the spool is in the position shown in Fig. 17 with the friction shaft 153 being driven by the spiral gear 154 from the source of power or motor through the spiral gear 168ᵇ hereinbefore described, the change gears 266 and 267 on the end of the shaft 153, coöperating with their mating gears, act through the ratchet clutch mechanism 162 and 162ª to rotate the sleeve 161 and thereby the cup gear 158 carried by this sleeve, and so rotate the gear 137, which in turn of course rotates the worm shaft 134 automatically when the clutch members 135 and 136 are in engagement. This speed of rotation of the worm shaft 134 is determined by the ratio of the change gears 266 and 267, and their mating gears. When the clutch spool 156 is shifted automatically by the cam disk 164ᶜ on the cam shaft 18 through the medium of the lever 164 to bring the dog 157 of the clutch spool 156 into engagement with the clutch fingers 160 and spread the same to have the friction member inside of the gear 158 coöperate with said gear, this gear 158 drives the gear 137 on the worm shaft 134 at the fixed high speed, and when this gear 158 revolves at this high speed the ratchet teeth on clutch 162ª on the end of the friction shaft 153 run away from the other portion 162 of this clutch, and the change gears 266 and 267 with their mating gears remain stationary. On the end of the friction shaft 153 is fastened a sprocket 163 for the purpose of operating an oil pump of some suitable design and on which will be mounted a sprocket to be connected with the sprocket 163 by a suitable chain. As hereinbefore stated, in the present machine, the rotating work cylinder 36 carries four work or rod spindles 14, which rotate in the cylinder, and as they all are constructed alike, a description of one will be sufficient.

The forward end of the cylinder is bored to receive a hardened steel bearing bushing 103 (see Fig. 16). The rear end of the cylinder 36 is also bored to receive a similar bushing 104. Directly behind each of these bushings 103 and 104 is a bore large enough to receive a ball thrust bearing 107 and 108 respectively. Directly back of each of these thrust bearings 107 and 108 is another bore suitable to receive felt washers 109. Keyed to the spindle drive or top shaft 56 and in the central chamber of the cylinder 36 against the rearward wall thereof is spindle drive gear 178 and loosely mounted on each spindle is a gear 119, which is bronzed bushed to run freely on the spindle and each of these gears is in mesh with the center gear 178. To an extended portion of the bronzed bushing 119ª is mounted a friction cup 120, which is also pinned to spindle gear 119. Inside of this friction cup 120 is a friction ring 121 and inside of this ring 121 and keyed to the spindle by suitable keys, key-ways and screws 219 is a friction body or member 122. A suitable section of the friction ring 121 is cut away conforming to the shape of friction expanding fingers 125, so as to allow these friction fingers 125 to be mounted on the friction body 122. Mounted on the spindle 14 in front of friction cup 120 is friction operating spool 123 and fastened to this spool at one side of the groove thereof, and in line with the friction expanding fingers 125 is a friction operating wedge or lug 126. At the opposite side of this spool and secured to the spindle 14 by similar keys, key-ways and gears 219ª is a friction body 122ª. Loosely mounted or keyed to this friction body 122ª is a friction ring 121ª, and this friction ring likewise has a suitable section cut away therefrom to allow another set of friction fingers 125ª to be mounted on friction body 122ª for coöperation with another operating wedge or leg 126ª carried by the friction spool 123. Suitable bronzed bearings or bushings 105 and 106 are mounted on the spindle by means of suitable keys to fill the bores of the bushings 103 and 104. At the rear of the cylinder 36 are located spindle adjusting nuts 116 and 117. The spindle chuck operating mechanism and stock feed mechanism shown at the rear of each of the spindles is of the usual well known construction and need not receive further description, since, as is well known, it is operated from the main cam shaft 18 by suitable cams to open and close the chuck at the end of each spindle and to feed the stock bars forward. As it is well understood in this art, each spindle is made up of a plurality of tubes, one within another, and for the present purposes the whole will be designated as the spindle. Each friction spool 123 has a groove therein and for the purpose of shifting each of these spools at a predetermined time in the rotation of the cylinder 36, a bronze shoe 127 is provided. This shoe is pivotally mounted to one end of an auxiliary lever 128 (see for instance Fig. 2), which lever is pivotally secured to the bed of the machine by a pivot bolt 129. The lower end of this lever 128 is connected by a link 130 to a friction operating lever 131, likewise pivotally hung on the bed of the machine by a pivot stud 132 and to the lower end of this friction operating lever 131 is secured a roller and stud 133, in position to come in contact with suitable cams 133ª and 133ᵇ on the cam drum 133ᶜ of the cam shaft 18. The cams on the cam drum 133ᶜ as hereinbefore stated operate during the rotation of the cam shaft 18 to shift the levers 131 and 128 and thereby successively shift each friction spool of each spindle as it is brought by the rotation of the cylinder 36 into position to contact with the shoe 127 carried by the lever 128. This shifting of the spool will expand the friction ring 121 through the medium of the expansion fingers 125 and the lug 126, and thus connect the spindle with the gear 119, whereby the spindle will be rotated by the gear 178 on the spindle driving shaft 56. When it is desired to stop the rotation of the spindle, one of the cams on the cam drum 133ᶜ reverses the direction of travel of the friction operating spool 123, thereby disconnecting the wedge 126 from the expansion fingers 125 and disconnecting the spindle with its gear 119, and at the same time expanding the opposite set of fingers 125ª by the lug 126ª, and thus clamp the friction ring 121ª to the cylinder proper, and thus stop the rotation of the spindle. In other words, after the gear 119 is disconnected from the spindle in the manner just described, the expansion of the opposite set of fingers 125ª causes the friction ring 121ª to act as a friction brake and stop the rotation of the spindle.

The mechanism for operating the adjustable stock feed levers (see Figs. 1, 9, 10 and 11) comprises the following: Projecting into the reel support bracket 21 at the rear end of the machine are stock feed slide rods 43, one at each side of the reel. The opposite ends of these rods are mounted in suitable bearings on the bed 2. Mounted on these rods to slide is a feed slide 41. This feed slide 41 is provided with a pair of angular faces (see Fig. 9) for the reception of a bronze shoe 42, which is bolted to either one or the other of these angular faces, the shoe never being used for both sides at the same time. In some instances it is used on one side and in other instances on the opposite side. This shoe 42 successively projects into the grooves of the stock feed tube spools 17 as the same are rotated successively into position with the cylinder 36, as this cylinder is indexed. Between the rods 43 the slide 41 is provided with an extended portion or bearing bored to receive the outer end of a feed control rod 46. To the outer sides of the bed 2 of the machine at a suitable distance between the cylinder casing 3 and the reel support bracket 21 is bolted adjacent to openings in said bed a pair of feed lever brackets 52 and 53 having projections or ears, to which ears or projections are pivoted to swing laterally a pair of auxiliary feed levers 44 and 45. At a suitable distance from the outer end of lever 45 and in the side thereof is a rectangular opening or hole, into which the inner end of feed control rod 46 projects, it being pivoted at this point to the lever 45. About midway of the length of lever 44 through the top thereof is located a rectangular opening 51 and at the outer end of this same lever 44 is also located another rectangular opening 51ª. On the under side of this lever 44 and between the openings 51 and 51ª is bolted a suitable roller 49. At the outer end of lever 45 on the under side thereof is fastened another roller 49ª, which works in the opening 51 of the lever 44. Lever 45 is also provided with a roller 49ᵇ on the under side thereof, this roller 49ᵇ being located between the pivotal connection of the rod 46 with said lever 45, and the pivoted end of said lever 45. When the roller 49 and the roller 49ᵇ of the lever 45 come in contact with suitable cams, not shown, on the cam drum 133ᶜ, the slide 41 by means of the levers 44 and 45 and the connecting rod 46, is caused to travel backward and forward, so that the shoe 42 will shift the particular feed tube with which the shoe 42 at the time is engaging the same distance that the slide 41 travels forward. By changing the roller 49ª from the opening 51 of lever 44 to opening 51ª of this same lever 44, a longer movement of the slide 41 and therefore a longer feed of the stock is obtained, and this by using the same cams on the cam drum 133ᶜ. In other words, if the lever 45 is connected with the lever 44 as shown in Fig. 11, a shorter movement of the slide 41 and therefore a shorter feed of the stock is obtained than is the case if this lever 45 is connected with the lever 44 at the extreme outer end of said lever 44, and this, as stated, by using the same cams on the cam drum 133ᶜ, so that by means of these adjustable stock feed levers it is not necessary to change the cams on the cam drum 133ᶜ. In other words, the same length of cams on the cam drum 133ᶜ will vary the lengths of stock feed by merely changing the connecting point of the levers. The adjustable collar 47 and the nut 48 on the rod also provide for variations in the travel of the slide 41 with either connection of the levers 44 and 45 hereinbefore referred to. In other words, when the collar 47 is close up to the lug or bearing 46ª for the shaft 46, the travel of the slide will be greater. If the collar is moved farther away from this lug or bearing the travel of the slide will be less. As hereinbefore stated, the operation of the chucks, to wit: the unlocking and locking thereof and the feeding of the stock is the same as that heretofore used in machines of the National-Acme, and no detailed description thereof is necessary, this being accomplished (see Figs. 1 and 10) by means of the lever 300 pivotally supported at 301 to the bed of the machine and having a shoe 302 adapted to successively coöperate with the grooves at the ends of the chuck tubes, this lever being operated by suitable cams not shown on the cam drum 133$^c$.

The threading die spindle or mechanism is constructed and operated as follows (see Figs. 2, 12, 19, 20 and 22):

The front end of this spindle is supported by a suitable bracket 191 on the main tool slide or carrier 4 and for this purpose the tool slide or carrier is provided with suitable ways 191$^a$ for the reception of tongues of the die spindle bracket, the main tool slide and the die bracket 191 thus having a sliding movement relatively to each other. The spindle is also supported in the rear of this bracket 191 by another bracket 191$^b$ secured to or formed as part of the bed 2 of the machine. The spindle at the rear end thereof is connected with the die spindle operating shaft 175 supported in the bearing or housing 214. This shaft 175 projects to the front of the bearing 214 and is provided with a driving collar 183, which is provided across the front face thereof with suitable grooves. Loosely mounted on the spindle driving shaft 175 and directly in front of this collar 183 is a universal connecting collar 184 having lugs in position to register with the grooves in the face of the collar 183. Extending over the projecting end of the die spindle operating shaft 175 is a die spindle sleeve 187 and the rear end of this sleeve is provided with suitable grooves that register with lugs on the opposite face of the collar 184. Located on this sleeve adjacent to the bracket bearing 191$^b$ (see Figs. 2 and 12) is a collar 268 fastened to the sleeve. The die spindle sleeve is centrally bored its entire length and the outer end thereof is provided with a key 224, and in the front bore of this sleeve is located the die spindle 188, it being secured within the sleeve by means of the key 224 to allow the spindle to travel longitudinally while rotating with the sleeve 187. To the inner end of the die spindle 188 is secured a tension spring 189. The opposite end of this spring is fastened to a suitable hook on the end of the driving spindle shaft 175. The front end of the die spindle 188 is flanged to rest against the sliding bracket 191 and an adjustable collar or nut 191$^c$ is located on the spindle directly against the other face of this bearing or bracket 191. A suitable bore in the end of the spindle 188 is provided to receive the die, tap or other cutting tool. In the present instance the spindle is shaped to receive a die holder 193. Located in extended bearings of the sliding bracket 191 and fixed bracket 191$^b$ and projecting into the bearing 214 and fastened to an extended bearing of lever 185, (see Fig. 3), is a tripping rod 198. This rod is made in three parts to permit the proper assemblage thereof. The outer end of this rod is provided with adjusting nuts 200 (see Fig. 2), one at each side of the extended bearing 191. The rod is also threaded to receive adjusting nuts 199 and 199$^a$ at each side of the extended bearing 191$^b$. These nuts however are not used when the die spindle is used as a drill spindle, but when the spindle is used for threading they are adjusted to suit the different lengths of threads required. Below this tripping rod 198 in suitable supports therefor, one of which is carried by sliding bracket 191 is located die kicker rod 201. The rear portion of this rod is threaded and two pairs of collars 202 and 202$^a$ are mounted thereon at a suitable distance apart. Between the two pairs of collars is located an unthreaded collar to which is pivotally connected the upper end of a kicker lever 194 (see Fig. 2). This lever is pivotally connected to the bed 2 and the angle end thereof is provided with a stud and roller 194$^a$ in position to contact with suitable cams on the cam drum 8. At the outer end of this kicker rod 201 and pinned thereto is a collar 208, this collar being located just beyond one of the bearings on brackets 208$^a$ carried by a portion of the slide 191. Located on this kicker rod 201 at the other side of bearing 208$^a$ is a spring-formed bumper. This bumper comprises a sleeve 209 mounted loosely on the kicker rod and between this sleeve and a collar pinned to the rod is a coiled spring and fastened to the collar so as to slide on the sleeve 209 and not interfere with the expansion and contraction of the spring inside of it, is a sleeve 206. As hereinbefore stated, the die spindle operating shaft 175 is housed within the bearing 214 directly above the work spindle operating shaft 56 (see Fig. 19), on which latter, as hereinbefore stated, is located the spur gear 169. The die spindle shaft 175 is of course in line with that work spindle in the cylinder, upon the work of which the die is to operate. In front of this spur gear 169 and pinned to this work spindle operating shaft 56 at either one of the two stations $y$ or $z$ is high speed twin gear 173 and loosely mounted on the die spindle operating shaft 175 to mesh with this gear 173 is twin high speed clutch gear 174. This gear revolves freely on the shaft 175, but is held against lengthwise movement thereon by means of a dog 258 working in a groove of the gear. In front of this twin gear 174 and keyed to slide laterally on the shaft 175 is a tooth clutch 176, it having teeth to register with teeth on the face of the gear 174. The opposite face of this clutch also has similar teeth. At a suitable distance from the twin gear 173 on the work spindle driving shaft 56 and pinned to said shaft at either of the stations *u* or *v* is low speed twin gear 177, and in mesh therewith and loosely mounted to revolve on die spindle shaft 175 is low speed twin driven gear 178. In a suitable bore of this gear 178 is located to shift laterally on keyways a clutch member 259 having clutch teeth that are adapted to mate with the clutch teeth on one of the faces of clutch 176. By means of screws and compression springs 260 the clutch member 259 will cushion or recede when connection is made under high speed. Keyed to the shaft 175 directly in back of clutch gear 178 is drilling spur gear 180, and keyed to the work spindle driving shaft 56 and in line with this spur gear 180 is a spur gear 179, and in mesh with this spur gear 178 and spur gear 180 and supported by a stud for this purpose on the bearing 214 is intermediate gear 181.

When the clutch 176 is in a neutral position as shown in Fig. 19 and the gears 179, 180 and 181 are in mesh with each other, the die spindle is then driven in one direction and used for drilling. Intermediate gear 181 is removed when threading by removing the stud upon which it rotates. It will be noted that the twin gears 173 and 177 on the shaft 56 and the clutch gears 174 and 178 on the die spindle shaft 175 have two diameters each. By shifting the twin gears 173 and 177 from the stations *y* to *z* and *v* to *u* or vice versa so that they will mesh with the corresponding portions of the gears 174 and 178, the speed of the die spindle can be controlled from a high speed to a low speed. Of course, when driving the die spindle either with the low speed or the high speed, the clutch member 176 must be shifted to the desired position either with gear 174 or with gear 178 according to the speed desired. This shifting of the clutch 176 is done by hand by means of a lever 185 (see Figs. 3 and 12) supported on the bearing 214 and having suitable bronze shoes in position to project into the groove of the clutch 176. Extending through this lever 185 is a connecting rod 223, to one end of which lever 221 (see Figs. 3 and 12) is pivoted and this lever 221 is also pivoted to the bed as at 222. To the lower end of this lever 221 is fastened a suitable stud and roller in position to come in contact with suitable cams 221$^a$ on the periphery of the cam disk 164$^c$, located on the cam shaft 18, this being the same cam disk that carries on the side face thereof the cams 164$^a$ and 164$^b$ for operating the lever 164. When the roller of this lever 221 comes in contact with the cams 221$^a$, the lever 221 acting through the connecting rod 223, provided the adjusting collars 224 thereof are properly set, will automatically shift the clutch 176 on the die spindle shaft 175, while the handle 185 of this clutch permits it to be, as hereinbefore stated, shifted by hand.

When therefore a work spindle of the cylinder 36 has been rotated in position to be in line with the threading die spindle 188 and such rotation of the work spindle has been stopped by the means hereinbefore described, the kicker lever 194 by means of the cams on the cam drum 8, provided the nuts 200, 202 and 202$^a$ of the kicker rod 201 have been properly adjusted, will carry the die spindle 188 forward out of its sleeve 187, thereby to permit the die on the end of the die spindle to engage the stock rod in the work spindle and so allow the die to thread or screw itself on to the rod. By then setting or adjusting the nuts 199, 199$^a$ and 200 properly, it follows that when the die has threaded a certain distance on the stock rod, the clutch 176 will be disconnected from the clutch driving gear 174 by the tripping rod 198 in connection with lever 185 thus arresting the threading when the work spindle is again rotated, in the manner herein explained after which the clutch 176 is shifted by means of lever 185 through suitable cams on the cam drum 164$^c$ into connection with gear 178. This rotates the die spindle at the same speed in the same direction, the work spindle running lefthanded at a faster speed than the die spindle and driven by gear 178 will release the die or tap from the work spindle whereupon the coiled spring 189 in the die spindle sleeve will draw the die spindle backward to its neutral or starting position. The foregoing mechanism provides a two-speed die spindle mechanism. Transposing the gears 173 and 177 from one station to another on the shaft 56 will regulate the cutting speed for brass or steel of the die spindle.

Directly in front of the cylinder 36 and its casing 3 and at right angles to the axis of the cylinder, and opposite to each other are located the cut-off and forming slides 5 and 6 (see Figs. 1, 2, 5 and 6) and on top of the casing 3 carrying the rotating cylinder 36 are the top slides 7. The cross slides, or as they are commonly called, the forming and cut-off slides, are supported one at each side of the cylinder, and for this purpose the bed has machined therein tongued ways to receive these slides. The bottoms of these tool slides 5 and 6 are machined taper (see Fig. 5) and tension shoes 101 are machined to fit the corresponding taper on the bottom of the slides and fill the corresponding space between the bottom of the slides and the tongued portion of the slideway. The bottom of the slideway is machined straight. An adjusting screw 101ª (see Fig. 5) is located in the lower portion of each of the slides, the head of the screw being counterbored partly into the lower portion of the slide and partly into the upper portion of the adjusting tension gib or shoe 101. A clamping screw 101ᵇ projects through the tension shoe and into the slide against the adjusting screw 101ª and clamps the screw 101ª tight when the same has been properly adjusted. A gib (see Fig. 2) 101ᶜ is also located between the lower tongued portion of each slide and the wall of the tongued bed and suitable adjusting screws are used in connection with the gib to give the proper tension against the slide. The bottom of the slides being tapered and the top of the bottom gibs 101 being tapered to conform to the taper on the slides and the bottom of the gibs 101 approximately fitting the straight portion of the tongued bed, it follows that on the proper manipulation of the adjusting screws 101ª, the gibs 101 are forced forward, thus tightening or taking up the play of the slides 5 and 6, so that these bottom gibs will take up any up and down or vertical play in the slides, while the side gibs 101ᶜ will take up any side play thereof when adjusted in the same manner. The bed at the under side of each slide is provided with an extended crotched bearing 82ª and as the means for operating both the forming and the cut-off slide are the same, an explanation of one will be considered sufficient. This crotched bearing 82ª is machined to receive a hexagon broached bushing and into the bore of this bushing is fitted a hexagon shaft 83. A tool slide lever 85 has a hexagon bore and is clamped to the hexagon shaft 83 and has its upper end projecting through a suitable clearance space in the bed, into a slot in the bottom and toward the rear of the slide. The purpose of having the separate hexagon bushing in the bore of the bearing 82ª is to make it possible to use a hexagon shaft to which to tighten the lever 85, and allow it to oscillate. Located at the outer end of the slide is an adjusting screw 98 and the end of the lever 85 is crotched or grooved to fit into a relieved portion of this screw 98. A clamping screw 99 is located at right angles to this screw 98 to clamp the screw 98 in its adjusted position. To the hexagon shaft 83 at one side of the lever 85 is clamped a lever 89. At a suitable distance above this lever and bolted to the bed is a crotched bracket 97 and pivotally swung from this crotched bracket is a compensating lever 87. The lower ends of both levers 87 and 89 are provided with elongated slots 93 for the reception of an adjustable fulcrum bolt 93ª secured in the slots by a washer and nut. The lever 87 is provided with an inwardly extending portion having a stud and roller 95 thereon. By adjusting or sliding the fulcrum bolt 93ª upward or downward and clamping it in its adjusted position, the fulcrum point for the lever 89 is changed. It will be understood that the bolt 93ª is clamped by means of a collar, nut and washer (see Fig. 6ª) tightly to one lever, while it extends through a bushing in the other lever slightly larger than the thickness of said lever, which allows said last lever to fulcrum from the bolt in whatever position the bolt is clamped relatively to the slots. The roller 95 on the end of lever 87 is in position to contact with suitable cams on cam disk 216 mounted on the main cam shaft 18, and by this means the forming and cut-off slides are carried forward and backward toward and from the work spindles at the proper times. The organization of the levers 87 and 89 provides a very simple means for adjusting the cut-off and forming slides, so that the tools thereof may impart different depths of cuts and this without the necessity of changing the cams on the cam drum for operating these cut-off and forming slides, as heretofore necessary. In other words, by merely changing the fulcrum point of the levers relatively to each other, the depth of the cut of the cut-off and forming slide tools are quickly changed without changing the cams on the cam disk 216. This is one of the very important improvements in the organization of the machine, since, as stated, it obviates the changing of the cams on the cam disk 216, as heretofore. This same lever adjusting means just described is also used in connection with the top slides about to be described.

Above the cylinder 3 (see Figs. 1, 2, 5 and 6) is mounted a bracket 231, and the extended overhanging portion of this bracket directly in line with the forming and cut-off slides 5 and 6, is provided with two sets of tongued ways located at an angle of 90° to each other and at an angle of 45° from the horizontal. Into these tongued ways are fitted top slides 232 and 232ª. These slides are fitted with the same form of tapered gibs or shoes and adjusting means as are the forming and cut-off slides 5 and 6, and therefore it is unnecessary to go into a further detailed description thereof. As both of these slides are operated in the same way, a description of one thereof will be deemed sufficient herein. At a suitable distance above each slide and supported in an extended crotched bearing of the top slide bracket is one end of a shaft 233. Fitted into the crotch of this bearing is a top slide operating lever 234, it being clamped to this end of the shaft 233. The lower end of this lever projects into an extended grooved portion 234ª of its top slide. The other end of this shaft 233 is suitably supported in an extended bearing of the top slide bracket 231, and to the end of this shaft 233 is fastened auxiliary top slide lever 235. This auxiliary lever 235 is provided with a rectangular opening 236, in which is located an adjusting shoe 237. An adjusting screw 238 and a binding screw 240 are located at right angles to each other in the rectangular portion of this auxiliary lever 235, and by loosening the binding screw 240 and adjusting the screw 238, the block 237 can be drawn forward or backward as may be required. To a pin 242 of the block 237 is pivotally secured the end of a depending rod 241, so that when the block 237 is adjusted, as hereinbefore described, this rod 241 will also be shifted. This rod 241 is in two pieces, and the parts are connected by a turn buckle nut 244, and the lower end of this rod 241 is bolted to a crotched lever 245, which in turn is clamped to the hexagon shaft 83 to which the lever 89 is secured, so that the same cam disk 216 and levers 87 and 89 operate not only to shift the forming and cut-off slides, but also the top slides. The turn buckle connection 244 in connection with the adjustment of the shoe 237 of the auxiliary lever 235 provides for variation of the amount of travel inward and outward of the top slides.

On the cam shaft 18 (see Fig. 5) directly in front of the rotating work cylinder 36, is bolted stop cam disk 248. Between the top of this disk and the bottom of the cylinder is located a shaft 249, which in turn is pivotally supported at either end of the bed. Mounted on this shaft between its bearings is a stop lever 250, the upper end of which carries an adjusting screw 250ª, having an enlarged head. The length of the lever 250 is such that the adjusting screw will be in line with the lower work spindles of the work cylinder when the cylinder is at rest. To the shaft 249 is fastened a depending stop lever 252, to the lower end of which is secured a roller 253, which is in position to contact on suitable cams on cam disk 248, whereby the shaft 249 is oscillated, and whereby the lever 250 is likewise oscillated transversely of the axes of the work spindles. The lever 250 is adjustable on the shaft 240, longitudinally thereof, it being held in place thereon by a screw 254 to permit the stop screw 250ª thereof to be positioned for different lengths of work.

We claim as our invention:

1. In a metal working machine, the combination of a bed, a rotatable work carrying cylinder, means for indexing it, a single sliding tool carrier comprising an enlarged tool carrying portion having its forward end supported by the cylinder and its rear end in the rear of said enlarged portion supported directly on the bed, and means for reciprocating said carrier.

2. In a metal working machine, the combination of a bed, a rotatable work carrying cylinder, means for indexing it, a single sliding tool carrier comprising an enlarged tool carrying portion having its forward end non-rotatably supported by the cylinder and its rear end in the rear of said enlarged portion supported directly by the bed for sliding movement, and means for reciprocating said carrier.

3. In a metal working machine, the combination of a rotatable work carrying cylinder, means for indexing it, a main sliding tool carrier comprising a body portion adapted to carry the tools and a pair of integral projecting ends, one slidingly supported by the cylinder and the other directly by the bed, and means for reciprocating said tool carrier.

4. In a metal working machine, the combination of a rotatable work carrying cylinder, means for indexing it, a main sliding tool carrier comprising a body portion and a pair of integral projecting tubular shafts, one slidingly supported in the cylinder and the other directly by the bed, and means for reciprocating said tool carrier.

5. The combination of a rotatable work carrying cylinder, means for indexing it, a sliding tool carrier having its forward end supported only by the cylinder, and means for reciprocating said tool carrier and including a supplemental shaft connected with the tool carrier at one side thereof and means for reciprocating the shaft.

6. In a metal working machine, the combination of a rotatable work carrying cylinder, means for indexing it, a sliding tool carrier, a shaft carrying said sliding tool carrier and having one end non-rotatably supported by said cylinder and the other end slidingly supported by the bed, and means for reciprocating the tool carrier and including a supplemental shaft connected with the tool carrier at one side thereof and means for reciprocating the shaft.

7. In a metal working machine, the combination of a rotatable work carrying cylinder, means for indexing it, a sliding tool carrier comprising a body portion adapted to carry the tools and a pair of integral projecting ends, one slidingly supported by the cylinder and the other by the bed, and means for reciprocating said tool carrier and including a supplemental shaft connected with the tool carrier at one side thereof and means for reciprocating the shaft.

8. In a metal working machine, the combination of a rotatable work carrying cylinder, means for indexing it, a sliding tool carrier comprising a body portion and a pair of integral projecting tubular shafts, one slidingly supported in the cylinder and the other by the bed, and means for reciprocating said tool carrier and including a supplemental shaft connected with the tool carrier at one side thereof and means for reciprocating the shaft.

9. In a metal working machine, the combination of the bed, a rotatable work carrying cylinder supported thereon, means for indexing it, a sliding tool carrier comprising a tool-carrying portion having a pair of projecting shafts, one supported by the cylinder and the other by the bed of the machine, said carrier having a depending bracket slidingly supported by the bed of the machine, a supplemental shaft pivotally secured to said bracket and slidingly supported by the bed of the machine, and means for reciprocating said shaft and thereby the carrier.

10. In a metal working machine having a bed, the combination of a rotatable work carrying cylinder carried thereby, means for indexing it, a sliding tool carrier comprising a tool-carrying portion having a pair of integral projecting tubular shafts, one slidingly supported by the cylinder and the other by the bed of the machine, a depending bracket secured to said carrier and slidingly supported by the bed of the machine, a supplemental shaft pivotally secured to said bracket and also slidingly supported by the bed of the machine, and means for reciprocating said supplemental shaft and thereby the tool carrier.

11. In a metal working machine, the combination of the bed, a work carrying cylinder supported thereby, means for indexing it, a sliding tool carrier comprising a tool-carrying portion having a pair of tubular projecting shafts non-rotatably supported relatively to said tool-carrying portion and one slidingly supported by the cylinder and the other by the bed, a supplemental shaft slidingly supported by the bed and connected to said tool carrier, and means for reciprocating said supplemental shaft and thereby the tool carrier.

12. In a metal working machine having a bed, the combination of a rotatable work carrying cylinder, means for indexing it, a sliding tool carrier supported at one end by the cylinder and at the other end by the bed and having intermediate thereof a sliding support on the bed, and means for reciprocating said carrier and including a supplemental shaft supported by the bed.

13. In a metal working machine having a bed, the combination of a rotatable work carrying cylinder, means for indexing it, a sliding tool carrier supported at one end by the cylinder and at the other end by the bed and also having an intermediate sliding support on said bed and including means pivotally connected to the carrier for reciprocating it.

14. In a metal working machine having a bed, the combination of a rotatable work carrying cylinder, means for indexing it, a sliding tool carrier supported at one end by the cylinder and at the other end by the bed and also having an intermediate sliding support on said bed and including means pivotally connected to the carrier for reciprocating it, said pivotally connected means including a rearwardly extending shaft slidingly supported by the bed.

15. In a metal working machine having a bed, the combination of a rotatable work carrying cylinder, means for indexing it, a main sliding tool carrier slidingly supported at one end by the cylinder and at the other end directly by the bed, means for reciprocating said tool carrier, and means for slidingly supporting said tool carrier on the bed between its ends whereby the deflection thereof is prevented.

16. In a metal working machine having a bed, the combination of a rotatable work carrying cylinder, means for indexing it, a sliding tool carrier, and means for reciprocating said carrier and including means supported by the bed and connected with the carrier for receiving the strain of the reciprocating means whereby such strain will not be imparted to the tool carrier.

17. In a metal working machine having a bed, the combination of a rotatable work carrying cylinder, means for indexing it, a sliding tool carrier partly supported by said cylinder and partly supported by said bed, and means for reciprocating said tool carrier and including intermediate means supported by said bed and connected with said carrier for relieving the strain of the reciprocating means on said carrier.

18. In a metal working machine having a bed, the combination of a rotatable work carrying cylinder, means for indexing it, a sliding tool carrier partly supported by said cylinder and partly supported by said bed, a cam shaft, a cam thereon, and means also slidingly supported by the bed and connected with said tool carrier and located between said cam and the carrier for receiving the strain of the cam and relieving the strain on the tool carrier.

19. In a metal working machine having a bed, the combination of a rotatable work carrying cylinder, means for indexing it, a sliding tool carrier partly supported by said cylinder and partly supported by said bed, a cam shaft, a cam thereon, and means also slidingly supported by the bed and connected with said tool carrier and located between said cam and the carrier for receiving the strain of the cam and relieving the strain on the tool carrier, said means including a shaft having a flexible connection with the tool carrier.

20. In a metal working machine having a bed, the combination of a rotatable work carrying cylinder, means for indexing it, a sliding tool carrier supported forwardly thereof by the cylinder and rearwardly thereof by the bed and supported intermediate of said supports on the bed, and means for reciprocating it and including means supported on the bed in the rear of said intermediate support and having a flexible connection with said carrier.

21. In a metal working machine having a bed, the combination of a rotatable work carrying cylinder, means for indexing it, a sliding tool carrier, and means for reciprocating said tool carrier and including non-rotatable means having a permanent flexible joint connection with said carrier.

22. In a metal working machine having a bed, the combination of a rotatable work carrying cylinder, means for indexing it, a sliding tool carrier, and means for reciprocating said tool carrier and including means having a flexible connection with said carrier and comprising a shaft slidingly supported on the bed.

23. In a metal working machine having a bed, the combination of a rotatable work carrying cylinder, means for indexing it, a sliding tool carrier, and means for reciprocating said tool carrier and including means having a flexible connection with said carrier and comprising a shaft slidingly supported on the bed between the reciprocating means and the carrier.

24. In a metal working machine having a bed, the combination of a rotatable work carrying cylinder, means for indexing it, a sliding tool carrier, a tubular shaft supporting it, one end projecting into the cylinder and the other carried by the bed, a depending bracket secured to said carrier and slidingly supported on the bed, a supplemental shaft flexibly connected to said bracket and slidingly supported on the bed, a cam shaft, a cam carried thereby, and a projection carried by said supplemental shaft for engagement with said cam.

25. In a metal working machine having a bed, the combination of a rotatable work carrying cylinder, means for indexing it, a sliding tool carrier supported at one end by said cylinder and at the other end by the bed, a depending bracket secured to said carrier and slidingly supported by the bed, a shaft slidingly supported by the bed and flexibly connected to said bracket and located in parallelism with said tool carrier below the same, and cam mechanism for reciprocating said shaft, the construction being such that the strain of the reciprocating means is not imparted to the tool carrier.

26. In a metal working machine having a bed, the combination of a rotatable work carrying cylinder, means for indexing it, a sliding tool carrier having a pair of projecting shafts, one slidingly projecting into the tool carrier and non-rotatable relatively thereto and the other slidingly supported by the bed, a depending bracket secured to the rear end of said tool carrier and slidingly supported by the bed, a shaft flexibly secured to said bracket and also slidingly supported by said bed at spaced intervals, and cam mechanism for engaging said last shaft between said spaced intervals.

27. In a metal working machine having a bed, the combination of a rotatable cylinder supported thereon, means for indexing it, a sliding tool carrier partly supported by the cylinder and partly supported by the bed and means for shifting said tool carrier by hand and comprising a lever adapted to be positioned in different stations on the bed, and means for reciprocating said carrier.

28. In a metal working machine having a bed, the combination of a rotatable cylinder supported thereon, means for indexing it, a sliding tool carrier partly supported by the cylinder and partly supported by the bed and means for shifting said tool carrier by hand and comprising a lever adapted to be positioned in different stations on the bed, and means for reciprocating said carrier and including a supplemental shaft slidingly supported by the bed and flexibly connected to said carrier.

29. In a metal working machine having a bed, the combination of a rotatable cylinder, means for indexing it, a non-rotatable shaft slidingly supported at one end by the cylinder and slidingly supported directly by the bed at the other end thereof, a squared tool carrier carried by said shaft, means for supporting the carrier on the bed intermediate of its ends, and means for reciprocating it and having a flexible indirect connection with said carrier whereby the strain of the reciprocating means will not be imparted to the carrier.

30. In a metal working machine having a bed, the combination of a sliding tool carrier, and means for reciprocating it and including means slidingly supported by the bed and having an indirect flexible connection with the carrier whereby the strain of the reciprocating means will not be imparted to the carrier.

31. In a metal working machine having a bed, the combination of a sliding tool carrier, and means for reciprocating it and including means slidingly supported by the bed and having an indirect flexible connection with the carrier whereby the strain of the reciprocating means will not be imparted to the carrier, and means for manually shifting said carrier and adjustable into different positions on the bed.

32. In a metal working machine, the combination of a rotatable work carrying cylinder, means for indexing it, a sliding tool carrier, means for reciprocating it, and means for placing the same constant tension on the cylinder during its rotary movement as during its idle movements.

33. In a metal working machine, the combination of a rotatable work carrying cylinder, means for indexing it, a sliding tool carrier, means for reciprocating it, means for adjusting the cylinder endwise, and means for placing the same constant tension on the cylinder during its rotary movement as during its idle movements.

34. In a metal working machine, the combination of a rotatable cylinder, means for indexing it, and means for placing the same constant tension on the cylinder during its rotary movement as during its idle movements.

35. In a metal working machine, the combination of a rotatable cylinder, means for indexing it and means for endwise adjusting it, and means for placing the same constant tension on the cylinder during its rotary movement as during its idle movements.

36. In a metal working machine, the combination of a rotatable cylinder having gear teeth thereon, a shaft located below said cylinder, a gear on said shaft having its teeth in mesh with the teeth of the cylinder, lugs carried by said gear, a cam shaft below said gear shaft, and a single arm having one end thereof secured to said cam shaft and having a length sufficient to extend above the axis of the lug carrying gear when said arm is in its upright position and having its end in position to engage the lugs of said gear thereby to rotate the gear and index the cylinder.

37. In a metal working machine, the combination of a rotatable cylinder having gear teeth approximately midway of its ends, and means engaging the teeth for indexing it, a sliding tool carrier partly supported by said cylinder and means for reciprocating it.

38. In a metal working machine, the combination of a rotatable work carrying cylinder having gear teeth located approximately midway between the ends thereof, a shaft located below the same, a gear on said shaft and likewise located approximately midway between the ends of said cylinder and having its teeth in mesh with the teeth of the cylinder, a series of spaced lugs secured to the side of said gear, a cam shaft below said shaft, a single arm having one end secured to said cam shaft and likewise located approximately midway between the ends of said cylinder, and a roller secured adjacent to the opposite end of said arm and in position to engage the lugs thereby to rotate said gear and thereby index the cylinder.

39. In a metal working machine, the combination of a rotatable work carrying cylinder having gear teeth located approximately midway between the ends thereof, a shaft located below the same, a gear on said shaft and likewise located approximately midway between the ends of said cylinder and having its teeth in mesh with the teeth of the cylinder, a series of spaced lugs secured to the side of said gear, a cam shaft below said shaft, a single arm having one end secured to said cam shaft and having a length sufficient to extend above the axis of said lug carrying gear when said arm is in its upright position, and means carried adjacent to the free end of said arm for engaging the lugs of said gear thereby to rotate it and thus index the cylinder.

40. In a metal working machine, the combination of a rotatable cylinder having gear teeth approximately midway thereof, a shaft, a gear on said shaft, a cam shaft, an arm thereon, and means between said arm and said gear for rotating the gear, thereby to index the cylinder, and means for adjusting the cylinder endwise.

41. In a metal working machine, the combination of a rotatable cylinder having gear teeth approximately midway thereof, a shaft, a gear on said shaft, a cam shaft, an arm thereon, and means between said arm and said gear for rotating the gear, thereby to index the cylinder and means for placing tension upon the cylinder.

42. In a metal working machine, the combination of a rotatable cylinder having gear teeth approximately midway thereof, a shaft, a gear on said shaft, a cam shaft, an arm thereon, and means between said arm and said gear for rotating the gear, thereby to index the cylinder, and means for adjusting the cylinder endwise and means for placing tension thereon.

43. In a metal working machine having a bed provided with a work carrying cylinder casing, a rotatable cylinder therein, means for indexing it, and means for supporting said cylinder rearwardly of said casing and including a hub formed member secured to the cylinder and projecting rearwardly therefrom.

44. In a metal working machine having a bed provided with a cylinder casing, a rotatable cylinder therein, means for indexing it, means for supporting said cylinder rearwardly of said casing, and means for adjusting said cylinder endwise relatively to the casing.

45. In a metal working machine having a bed provided with a cylinder casing, a rotatable cylinder therein, means for indexing it, and means for supporting said cylinder rearwardly of said casing and means for adjusting said cylinder endwise relatively to the casing and means for imparting tension to said cylinder within the casing.

46. In a metal working machine having a bed provided with a cylinder casing, a rotatable cylinder therein, means for indexing it, and means for supporting said cylinder rearwardly of said casing and comprising a reel supported on the bed, a hub formed member secured to the cylinder and projecting rearwardly therefrom, and a shaft secured to said reel and within said hub formed member.

47. In a metal working machine having a bed provided with a cylinder casing, a rotatable cylinder therein, means for indexing it, and means for supporting said cylinder rearwardly of said casing and comprising a reel supported on the bed, a shaft connected thereto and a spider-formed disk connecting the opposite end thereof with the cylinder.

48. In a metal working machine having a bed, the combination of a rotatable cylinder, means for indexing it, a sliding tool carrier, means for reciprocating it, a stock supporting reel located on the bed, a member secured to the rear of the cylinder and spaced therefrom adjacent to the axis thereof and connected with the reel axially of said reel and cylinder for rotary movement therewith.

49. In a metal working machine having a bed, the combination of a rotatable cylinder, means for indexing it, a sliding tool carrier, means for reciprocating it, and a stock supporting reel located on the bed and connected with the cylinder for rotary movement therewith, said connecting means comprising a shaft having a disk, said reel and disk having, one pins and the other openings for the reception of said pins.

50. In a metal working machine having a bed, the combination of a rotatable cylinder, means for indexing it, a sliding tool carrier, means for reciprocating it, and a stock supporting reel located on the bed and connected with the cylinder for rotary movement therewith, said connecting means comprising a shaft having a disk, said reel and disk having, one pins and the other openings for the reception of said pins, and rollers for supporting said reel.

51. In a metal working machine, the combination of a rotatable cylinder, means for indexing it, a spider-formed disk secured to the cylinder, and means secured thereto for adjusting the cylinder endwise.

52. In a metal working machine, the combination of a rotatable cylinder, means for indexing it, a spider-formed disk secured to the cylinder, means secured thereto for adjusting the cylinder endwise, and means for supporting the spider rearwardly of the cylinder.

53. In a metal working machine, the combination of a rotatable cylinder, means for indexing it, a spider-formed disk secured to the cylinder, means secured thereto for adjusting the cylinder endwise, and means for supporting the spider rearwardly of the cylinder and comprising a stock reel supported by the bed and shaft-connected with said spider.

54. In a metal working machine, the combination of a rotatable cylinder, means for indexing it, a spider-formed disk secured to the cylinder, means secured thereto for adjusting the cylinder endwise, means for supporting the spider rearwardly of the cylinder and comprising a stock reel supported by the bed and shaft-connected with said spider, and friction rolls for supporting said reel.

55. In a metal working machine, the combination of a rotatable cylinder, means for indexing it, and means for locking it comprising a spring pressed locking bolt, a lever for shifting said bolt, a cam shaft, and a positive cam thereon for positively forcing the bolt into its locking position and then holding it there, said cam formed to coact with the end of the lever and draw it toward the cam shaft.

56. In a metal working machine, the combination of a rotatable cylinder, means for indexing it, and means for locking it comprising a spring pressed locking bolt having a roller, a lever for shifting said bolt, a cam shaft, and a positive cam thereon for forcing the bolt into its locking position and positively holding it there, said cam having a laterally projecting wedge formed flange adapted to pass on top of said roller and draw the end of the lever toward the cam shaft.

57. In an automatic multiple spindle machine, the combination of a rotatable work cylinder, a sliding tool carrier, a cam shaft, means thereon for indexing the cylinder and reciprocating the tool carrier, means for rotating the cam shaft and including a worm wheel loosely mounted on the shaft, a member fixed to said shaft, and a positively acting safety device between said worm wheel and said member.

58. In an automatic multiple spindle machine, the combination of a rotatable work cylinder, a sliding tool carrier, a cam shaft, means thereon for indexing the cylinder and reciprocating the tool carrier, means for rotating the cam shaft and including a worm wheel loosely mounted on the shaft, a member fixed to said shaft, and a positively acting safety device extending into said worm wheel and said member and comprising shearable pins.

59. In an automatic multiple spindle machine, the combination of a rotatable cylinder, a sliding tool carrier, a cam shaft from which the cylinder is rotated and the tool carrier reciprocated, and means for rotating the cam shaft and including a gear loose thereon, and a positively operating safety device connecting said gear and cam shaft.

60. In an automatic multiple spindle machine, the combination of a rotatable cylinder, a sliding tool carrier, a cam shaft from which the cylinder is rotated and the tool carrier reciprocated, and means for rotating the cam shaft and including a gear loose thereon, means fixed to said shaft, and a positively operating safety device connecting said gear and fixed means and comprising a part projecting from one into the other.

61. In an automatic multiple spindle machine, the combination of a rotatable cylinder, a sliding tool carrier, a cam shaft from which the cylinder is rotated and the tool carrier reciprocated, and means for rotating the cam shaft and including a worm wheel member, a member fixed to said shaft and a positively operating safety device comprising a shearable pin or pins for effecting a positive connection between said worm wheel member and said fixed member.

62. In a metal working machine, the combination of a rotatable cylinder, a sliding tool carrier, a cam shaft, means thereon for sliding the carrier and for indexing the cylinder, means for rotating said shaft at different speeds and including a pair of members, one loose on said shaft and the other fixed thereto and one comprising a worm wheel, and a safety pin or pins connecting said pair of members.

63. In a metal working machine, the combination of a rotatable cylinder, a sliding tool carrier, a cam shaft, means thereon for indexing the cylinder and reciprocating the tool carrier, means for rotating said cam shaft and including a pair of cross shafts, one a worm shaft and the other a friction shaft, and means for transmitting power from one to the other and thereby to the cam shaft.

64. In a metal working machine, the combination of a rotatable cylinder, a sliding tool carrier, a cam shaft, means thereon for indexing the cylinder and reciprocating the tool carrier, means for rotating said cam shaft and including a pair of cross shafts, one a worm shaft and the other a friction shaft, means for transmitting power from one to the other and thereby to the cam shaft, and means operative to disconnect said shafts thereby to interfere with the automatic drive therebetween.

65. In a metal working machine, the combination of a rotatable cylinder, a sliding tool carrier, a cam shaft, means thereon for indexing the cylinder and reciprocating the tool carrier, means for rotating said cam shaft and including a pair of cross shafts, one a worm shaft and the other a friction shaft, means for transmitting power from one to the other and thereby to the cam shaft, and means operative to disconnect said shafts thereby to interfere with the automatic drive therebetween and also operative to connect the worm shaft thereby to permit it to be hand operated.

66. In a metal working machine, the combination of a rotatable cylinder, a sliding tool carrier, a cam shaft, means thereon for indexing the cylinder and reciprocating the tool carrier, means for rotating said cam shaft at different speeds and including a pair of cross shafts, one a worm shaft and the other a friction shaft, and means for transmitting power from one to the other and thereby to the cam shaft.

67. In a metal working machine, the combination of a rotatable cylinder, a sliding tool carrier, a cam shaft, means thereon for indexing the cylinder and reciprocating the tool carrier, means for rotating said cam shaft at different speeds and including a pair of cross shafts, one a worm shaft and the other a friction shaft, means for transmitting power from one to the other and thereby to the cam shaft, and means controlled by the cam shaft and coöperating with mechanism on the friction shaft for varying the speed of said cam shaft.

68. In a metal working machine, the combination of a rotatable cylinder, a sliding tool carrier, a cam shaft, means thereon for indexing the cylinder and reciprocating the tool carrier, means for rotating said cam shaft at different speeds and including a pair of cross shafts, one a worm shaft and the other a friction shaft, means for transmitting power from one to the other and thereby to the cam shaft, means controlled by the cam shaft and coöperating with mechanism on the friction shaft for varying the speed of said cam shaft, and means on the worm shaft for disconnecting the friction shaft from the worm shaft thereby to interfere with the automatic drive thereof.

69. In a metal working machine, the combination of a rotatable cylinder, a sliding tool carrier, a cam shaft, means thereon for indexing the cylinder and reciprocating the tool carrier, means for rotating said cam shaft at different speeds and including a pair of cross shafts, one a worm shaft and the other a friction shaft, means for transmitting power from one to the other and thereby to the cam shaft, means controlled by the cam shaft and coöperating with mechanism on the friction shaft for varying the speed of said cam shaft, and means on the worm shaft for disconnecting the friction shaft from the worm shaft thereby to interfere with the automatic drive thereof, said means also operative on the disconnection of the automatic drive to connect up said worm shaft to permit the same to be hand-driven.

70. In a metal working machine, the combination of a rotatable work carrying cylinder, a sliding tool carrier, a shaft carrying said sliding tool carrier and slidingly supported by said cylinder for non-rotation therewith, a cam shaft, means for indexing the cylinder from the cam shaft, means for reciprocating the sliding tool carrier from the cam shaft, means for automatically rotating said cam shaft and including a friction shaft and a worm shaft, and means connecting said shafts.

71. In a metal working machine, the combination of a rotatable work carrying cylinder, a sliding tool carrier, a shaft carrying said sliding tool carrier and slidingly supported by said cylinder for non-rotation therewith, a cam shaft, means for indexing the cylinder from the cam shaft, means for reciprocating the sliding tool carrier from the cam shaft, means for automatically rotating said cam shaft and including a friction shaft and a worm shaft, and means connecting said shafts, the said shafts supported crosswise of the worm shaft.

72. In a metal working machine, the combination of a rotatable work carrying cylinder, a sliding tool carrier, a shaft carrying said sliding tool carrier and slidingly supported by said cylinder for non-rotation therewith, a cam shaft, means for indexing the cylinder from the cam shaft, means for reciprocating the sliding tool carrier from the cam shaft, means for automatically rotating said cam shaft and including a friction shaft and a worm shaft, and means connecting said shafts, said friction shaft having means thereon for rotating the cam shaft at different speeds.

73. In a metal working machine, the combination of a rotatable work carrying cylinder, a sliding tool carrier, a shaft carrying said sliding tool carrier and slidingly supported by said cylinder for non-rotation therewith, a cam shaft, means for indexing the cylinder from the cam shaft, means for reciprocating the sliding tool carrier from the cam shaft, means for automatically rotating said cam shaft and including a friction shaft and a worm shaft, means connecting said shafts, said friction shaft having means thereon for rotating the cam shaft at different speeds, and means connecting said cam shaft with said means on the friction shaft for automatically changing such speeds.

74. In a metal working machine, the combination of a rotatable work carrying cylinder, a sliding tool carrier, a shaft carrying said sliding tool carrier and slidingly supported by said cylinder for non-rotation therewith, a cam shaft, means for indexing the cylinder from the cam shaft, means for reciprocating the sliding tool carrier from the cam shaft, means for automatically rotating said cam shaft and including a friction shaft and a worm shaft, means connecting said shafts, said friction shaft having means thereon for rotating the cam shaft at different speeds, means connecting said cam shaft with said means on the friction shaft for automatically changing such speeds, and means on the worm shaft for disconnecting the friction shaft from the worm shaft thereby to interfere with the automatic drive of the cam shaft.

75. In a metal working machine, the combination of a rotatable work carrying cylinder, a sliding tool carrier, a shaft carrying said sliding tool carrier and slidingly supported by said cylinder for non-rotation therewith, a cam shaft, means for indexing the cylinder from the cam shaft, means for reciprocating the sliding tool carrier from the cam shaft, means for automatically rotating said cam shaft and including a friction shaft and a worm shaft, means connecting said shafts, said friction shaft having means thereon for rotating the cam shaft at different speeds, means connecting said cam shaft with said means on the friction shaft for automatically changing such speeds, and means on the worm shaft for disconnecting the friction shaft from the worm shaft thereby to interfere with the automatic drive of the cam shaft and for also connecting said worm shaft with the cam shaft thereby to permit the same to be hand-driven.

76. In a metal working machine having a bed, a rotatable work carrying cylinder supported thereon, a sliding tool carrier partly supported by said cylinder and by said bed, a cam shaft, means for indexing the cylinder from the cam shaft, means having a flexible connection with the work carrier, means connected with the cam shaft for operating said last means, means for rotating said cam shaft and including a friction shaft and a worm shaft, and means connecting the same.

77. In a metal working machine having a bed, a rotatable work carrying cylinder supported thereon, a sliding tool carrier partly supported by said cylinder and by said bed, a cam shaft, means for indexing the cylinder from the cam shaft, means having a flexible connection with the work carrier, means connected with the cam shaft for operating said last means, means for rotating said cam shaft and including a friction shaft and a worm shaft, means connecting the same, means on the friction shaft for imparting different speeds to the cam shaft, and means connected to the cam shaft and coöperating with said last means for automatically changing such speeds.

78. In a metal working machine having a bed, a rotatable work carrying cylinder supported thereon, a sliding tool carrier partly supported by said cylinder and by said bed, a cam shaft, means for indexing the cylinder from the cam shaft, means having a flexible connection with the work carrier, means connected with the cam shaft for operating said last means, means for rotating said cam shaft and including a friction shaft and a worm shaft, means connecting the same, means on the friction shaft for imparting different speeds to the cam shaft and means connected to the cam shaft and coöperating with said last means for automatically changing such speeds, and means on the worm shaft for disconnecting the same from the friction shaft thereby to interfere with the automatic drive of the cam shaft.

79. In a metal working machine having a bed, a rotatable work carrying cylinder supported thereon, a sliding tool carrier partly supported by said cylinder and by said bed, a cam shaft, means for indexing the cylinder from the cam shaft, means having a flexible connection with the work carrier, means connected with the cam shaft for operating said last means, means for rotating said cam shaft and including a friction shaft and a worm shaft, means connecting the same, means on the friction shaft for imparting different speeds to the cam shaft, means connected to the cam shaft and coöperating with said last means for automatically changing such speeds, and means on the worm shaft for disconnecting the same from the friction shaft thereby to interfere with the automatic drive of the cam shaft and for also connecting said worm shaft to permit the cam shaft to be hand-driven.

80. In a metal working machine, the combination of a rotatable cylinder, a sliding tool carrier, a cam shaft for indexing the cylinder and reciprocating the tool carrier, a feed tube and a sliding adjustable stock feed for feeding said tube.

81. In a metal working machine, the combination of a rotatable cylinder, a sliding tool carrier, a cam shaft for indexing the cylinder and reciprocating the tool carrier, an adjustable stock feed mechanism adjustable to vary the feed of the stock through the cylinder without varying the length of the cams on the cam shaft, and a plurality of means for adjusting said stock feed, each effective independently of the other.

82. In a metal working machine, the combination of a rotatable cylinder, a sliding tool carrier, a cam shaft for indexing the cylinder and reciprocating the tool carrier, and an adjustable stock feed mechanism adjustable to vary the feed of the stock through the cylinder without varying the length of the cams on the cam shaft and comprising a slide, a stock feed shoe carried thereby, a stock feed tube projecting into the cylinder and coöperating with said shoe and adjustable levers connected with said slide.

83. In a metal working machine, the combination of a rotatable cylinder, a cam shaft, means thereon for indexing said cylinder, stock feed tubes projecting into the cylinder, a slide, a shoe carried thereby for successively engaging each of the stock feed levers, and levers operated by said cam shaft and connected with said slide for shifting the same.

84. In a metal working machine, the combination of a rotatable cylinder, a cam shaft, means thereon for indexing said cylinder, stock feed tubes projecting into the cylinder, a slide, a shoe carried thereby for successively engaging each of the stock feed levers, levers operated by said cam shaft and connected with said slide for shifting the same, said levers being adjustable relatively to each other whereby the feed of the stock may be varied without changing the cams on the cam shaft.

85. In a metal working machine, the combination of a rotatable cylinder, a cam shaft, means thereon for indexing said cylinder, stock feed tubes projecting into the cylinder, a slide, a shoe carried thereby for successively engaging each of the stock feed levers, levers operated by said cam shaft and connected with said slide for shifting the same, said levers being adjustable relatively to each other whereby the feed of the stock may be varied without changing the cams on the cam shaft and said levers also adjustable relatively to said slide.

86. In a metal working machine, the combination of a rotatable cylinder, a cam shaft, means thereon for indexing said cylinder, stock feed tubes projecting into the cylinder, a slide, a shoe carried thereby for successively engaging each of the stock feed levers, levers operated by said cam shaft and connected with said slide for shifting the same, said levers being adjustable relatively to each other whereby the feed of the stock may be varied without changing the cams on the cam shaft and said levers also adjustable relatively to said slide, said levers having a pivotal connection with the bed of the machine.

87. In a metal working machine, the combination of a rotatable cylinder, a cam shaft, means connected with the cam shaft for indexing said cylinder, a stock feed slide, means connected therewith for feeding stock through the cylinder, and means connected with the slide and operated by said cam shaft for shifting said slide.

88. In a metal working machine, the combination of a rotatable cylinder, a cam shaft, means connected with the cam shaft for indexing said cylinder, a stock feed slide, means connected therewith for feeding stock through the cylinder, and means connected with the slide and operated by said cam shaft for shifting said slide and comprising a pair of pivotally supported levers.

89. In a metal working machine, the combination of a rotatable cylinder, a cam shaft, means connected with the cam shaft for indexing said cylinder, a stock feed slide, means connected therewith for feeding stock through the cylinder, and means connected with the slide and operated by said cam shaft for shifting said slide and comprising a pair of pivotally supported levers intersecting each other.

90. In a metal working machine, the combination of a rotatable cylinder, a cam shaft, means connected with the cam shaft for indexing said cylinder, a stock feed slide, means connected therewith for feeding stock through the cylinder, means connected with the slide and operated by said cam shaft for shifting said slide and comprising a pair of pivotally supported levers intersecting each other, and means for changing the adjustment of said levers relatively to the slide thereby to vary the feeding movement of the stock.

91. In a metal working machine, the combination of a rotatable cylinder, a cam shaft, means carried by the shaft for indexing said cylinder, a stock supporting reel supported rearwardly of the cylinder and connected therewith for rotation thereby, and an adjustable stock feed located between the cylinder and the stock supporting reel.

92. In a metal working machine, the combination of a rotatable cylinder, a cam shaft, means carried by the shaft for indexing said cylinder, a stock supporting reel supported rearwardly of the cylinder and connected therewith for rotation thereby, and an adjustable stock feed located between the cylinder and the stock supporting reel and comprising a slide and means connected therewith and operated from said cam shaft for shifting said slide.

93. In a metal working machine, the combination of a rotatable cylinder, a cam shaft, means carried by the shaft for indexing said cylinder, a stock supporting reel supported rearwardly of the cylinder and connected therewith for rotation thereby, and an adjustable stock feed located between the cylinder and the stock supporting reel and comprising a slide and means connected therewith and operated from said cam shaft for shifting said slide and comprising a pair of pivotally supported levers.

94. In a metal working machine, the combination of a rotatable cylinder, a cam shaft, means carried by the shaft for indexing said cylinder, a stock supporting reel supported rearwardly of the cylinder and connected therewith for rotation thereby, an adjustable stock feed located between the cylinder and the stock supporting reel and comprising a slide and means connected therewith and operated from said cam shaft for shifting said slide and comprising a pair of pivotally supported levers, and means for changing the adjustment of said levers relatively to each other thereby to vary the shiftable movement of the slide.

95. In a metal working machine, the combination of a rotatable work carrying cylinder, a sliding tool carrier an integral end thereof supported for sliding non-rotatable movement by the cylinder, a cam shaft, means carried thereby for indexing the cylinder and for reciprocating the tool carrier, an oscillating shaft, means operated by the cam shaft for oscillating said shaft, and a stop device carried by said oscillating shaft between the sliding tool carrier and the rotating cylinder.

96. In a metal working machine, the combination of a rotatable work carrying cylinder, a sliding tool carrier an integral end thereof supported for sliding non-rotatable movement by the cylinder, a cam shaft, means carried thereby for indexing the cylinder and for reciprocating the tool carrier, an oscillating shaft, means operated by the cam shaft for oscillating said shaft, and a stop device carried by said oscillating shaft between the sliding tool carrier and the rotating cylinder and adjustable on said oscillating shaft.

97. In a metal working machine, the combination of a rotatable work carrying cylinder, a sliding tool carrier having an integral end thereof slidingly supported by the cylinder for non-rotatable movement therewith, and a rotatable spindle slidingly supported on said tool carrier, and means for rotating said spindle.

98. In a metal working machine, the combination of a rotatable work carrying cylinder, a sliding tool carrier having an integral end thereof slidingly supported by the cylinder for non-rotatable movement therewith, and a rotatable spindle slidingly supported on said tool carrier, and means for rotating said spindle, said spindle comprising a pair of telescopic members, and a spring connecting one of said members with the means for rotating said spindle.

99. In a metal working machine, the combination of a rotatable work carrying cylinder, means for indexing the cylinder, a sliding tool carrier having one end thereof slidingly supported by the cylinder for non-rotation therewith and the other end thereof slidingly supported on the bed, a threading die spindle slidingly supported by said tool carrier and comprising a pair of telescopic members, a shaft, a spring connecting one of said members with said shaft, and means for rotating said shaft.

100. In a metal working machine, the combination of a rotatable work carrying cylinder, means for indexing the cylinder, a sliding tool carrier having one end thereof slidingly supported by the cylinder for non-rotation therewith and the other end thereof slidingly supported on the bed, a threading die spindle slidingly supported by said tool carrier and comprising a pair of telescopic members, a shaft, a spring connecting one of said members with said shaft, and means for rotating said shaft at different speeds.

101. In a metal working machine, the combination of a rotatable work carrying cylinder, means for indexing the cylinder, a sliding tool carrier having one end thereof slidingly supported by the cylinder for non-rotation therewith and the other end thereof slidingly supported on the bed, a threading die spindle slidingly supported by said tool carrier and comprising a pair of telescopic members, a shaft, a spring connecting one of said members with said shaft, a plurality of work spindles carried by the cylinder, a work spindle driving shaft, and means connecting said shaft with the die spindle shaft.

102. In a metal working machine, the combination of a rotatable work carrying cylinder, means for indexing the cylinder, a sliding tool carrier having one end thereof slidingly supported by the cylinder for non-rotation therewith and the other end thereof slidingly supported on the bed, a threading die spindle slidingly supported by said tool carrier and comprising a pair of telescopic members, a shaft, a spring connecting one of said members with said shaft, a plurality of work spindles carried by the cylinder, a work spindle driving shaft, and means connecting said shaft with said die spindle shaft and including means for rotating the die spindle shaft at different speeds.

103. In a metal working machine, the combination of a rotatable work carrying cylinder, means for indexing the cylinder, a sliding tool carrier having one end thereof slidingly supported by the cylinder for non-rotation therewith and the other end thereof slidingly supported on the bed, a threading die spindle slidingly supported by said tool carrier and comprising a pair of telescopic members, a shaft, a spring connecting one of said members with said shaft, a plurality of work spindles carried by the cylinder, a work spindle driving shaft, and means connecting said shaft with said die spindle shaft and including means for rotating the die spindle shaft at different speeds and comprising two sets of twin gears.

104. In a metal working machine, the combination of a rotatable work carrying cylinder, means for indexing the cylinder, a sliding tool carrier having one end thereof slidingly supported by the cylinder for non-rotation therewith and the other end thereof slidingly supported on the bed, a threading die spindle slidingly supported by said tool carrier and comprising a pair of telescopic members, a shaft, a spring connecting one of said members with said shaft, a plurality of work spindles carried by the cylinder, a work spindle driving shaft, and means connecting said shaft with said die spindle shaft and including means for rotating the die spindle shaft at different speeds and comprising two sets of twin gears and also including means for reversing said die spindle shaft.

105. In a metal working machine, the combination of a rotatable cylinder, means for indexing it, a sliding tool carrier, means for reciprocating it, a die spindle partly supported by said tool carrier, having a projecting end movable with said carrier and extending into said cylinder whereby said carrier has one end supported by said cylinder, a plurality of work spindles carried by the cylinder, a work spindle driving shaft, and means for rotating the die spindle from the work spindle shaft and including means for rotating the die spindle at different speeds.

106. In a metal working machine, the combination of a rotatable cylinder, means for indexing it, a sliding tool carrier having a projecting end movable with said carrier and extending into said cylinder whereby said carrier has one end supported by said cylinder, means for reciprocating it, a die spindle partly supported by said tool carrier, a plurality of work spindles carried by the cylinder, a work spindle driving shaft, and means for rotating the die spindle from the work spindle shaft and including means for rotating the die spindle at different speeds and also for reversing the die spindle.

107. In a metal working machine, the combination of a rotatable cylinder, means for indexing it, a sliding tool carrier, means for reciprocating it, a die spindle, a plurality of work spindles carried by the cylinder, a work spindle driving shaft, and means for rotating the die spindle from the work spindle shaft and including means for rotating the die spindle at different speeds and also for reversing the die spindle and comprising two sets of meshing twin gears and an automatically shiftable clutch.

108. In a metal working machine, the combination of a rotatable cylinder, means for indexing it, a sliding tool carrier, means for reciprocating it, a die spindle, a plurality of work spindles carried by the cylinder, a work spindle driving shaft, means for rotating the die spindle from the work spindle shaft and including means for rotating the die spindle at different speeds and also for reversing the die spindle and comprising two sets of meshing twin gears and an automatically shiftable clutch, and means for manually shifting said clutch.

109. In a metal working machine, the combination of a rotatable cylinder, a sliding tool carrier, a cam shaft, means operative therefrom for rotating the cylinder and reciprocating the tool carrier, a work spindle driving shaft, a reciprocating die spindle, a die shaft in alinement with the die spindle, means connecting the work spindle shaft with the die spindle shaft for rotating the die spindle at different speeds, and means operated by the cam shaft for automatically varying the speed of the die spindle.

110. In a metal working machine, the combination of a rotatable cylinder, a sliding tool carrier, a cam shaft, means operative therefrom for rotating the cylinder and reciprocating the tool carrier, a work spindle driving shaft, a reciprocating die spindle, a die shaft in alinement with the die spindle, means connecting the work spindle shaft with the die spindle shaft for rotating the die spindle at different speeds, and means operated by the cam shaft for automatically varying the speed of the die spindle, said means including clutch mechanism.

111. In a metal working machine, the combination of a rotatable cylinder, a sliding tool carrier, a cam shaft, means operative therefrom for rotating the cylinder and reciprocating the tool carrier, a work spindle driving shaft, a reciprocating die spindle, a die shaft, means connecting the work spindle shaft with the die spindle shaft for rotating the die spindle at different speeds, and means operated by the cam shaft for automatically varying the speed of the die spindle, said means including clutch mechanism carried by the die shaft.

112. In a metal working machine, the combination of a rotatable cylinder, a sliding tool carrier, a cam shaft, means operative therefrom for rotating the cylinder and reciprocating the tool carrier, a work spindle driving shaft, a reciprocating die spindle, a die shaft in alinement with the die spindle, means connecting the work spindle shaft with the die spindle shaft for rotating the die spindle at different speeds, and means operated by the cam shaft for automatically varying the speed of the die spindle, said means including clutch mechanism, said clutch mechanism being carried by said die shaft.

113. In a metal working machine, the combination of a rotatable cylinder, a sliding tool carrier, a cam shaft, means operative therefrom for rotating the cylinder and reciprocating the tool carrier, a work spindle driving shaft, a reciprocating die spindle, a die shaft in alinement with the die spindle, means connecting the work spindle shaft with the die spindle shaft for rotating the die spindle at different speeds, and means operated by the cam shaft for automatically varying the speed of the die spindle, said means including clutch mechanism and also including means manually operative for controlling said clutch mechanism.

114. In a metal working machine, the combination of a rotatable cylinder, a sliding tool carrier, a cam shaft, means operative therefrom for rotating the cylinder and reciprocating the tool carrier, a work spindle driving shaft, a reciprocating die spindle, a die shaft, means connecting the work spindle shaft with the die spindle shaft for rotating the die spindle at different speeds, said means comprising two sets of twin gears, each set comprising two pairs, one pair fixed to the work spindle shaft and adjustable thereon and the other pair loosely mounted on the die shaft, and a shiftable clutch member keyed to the die spindle shaft and automatically shifted from the cam shaft for coöperating with either of the two sets of gears on the die spindle shaft.

115. In a metal working machine, the combination of a rotatable cylinder, a sliding tool carrier, a cam shaft, means operative therefrom for rotating the cylinder and reciprocating the tool carrier, a work spindle driving shaft, a reciprocating die spindle, a die shaft, means connecting the work spindle shaft with the die spindle shaft for rotating the die spindle at different speeds, said means comprising two sets of twin gears, each set comprising two pairs, one pair fixed to the work spindle shaft and adjustable thereon and the other pair loosely mounted on the die shaft, and a shiftable clutch member keyed to the die spindle shaft and automatically shifted from the cam shaft for coöperating with either of the two sets of gears on the die spindle shaft and means for manually shifting said clutch member.

116. In a metal working machine, the combination of a rotatable cylinder, a sliding tool carrier, a cam shaft, means operative therefrom for rotating the cylinder and reciprocating the tool carrier, a work spindle driving shaft, a reciprocating die spindle, a die shaft, means connecting the work spindle shaft with the die spindle shaft for rotating the die spindle at different speeds, said means comprising two sets of twin gears, each set comprising two pairs, one pair fixed to the work spindle shaft and adjustable thereon and the other pair loosely mounted on the die shaft, and a shiftable clutch member keyed to the die spindle shaft and automatically shifted from the cam shaft for coöperating with either of the two sets of gears on the die spindle shaft, one set of said gears on the die spindle shaft having a cushioned clutch member.

117. In a metal working machine, the combination of a rotary cylinder, a sliding tool carrier having one end thereof non-rotatably but slidingly supported by said cylinder, a cam shaft, means thereon for indexing the cylinder and reciprocating the tool carrier, a threading die spindle slidingly supported on said sliding tool carrier, means for rotating said die spindle, and means operative from the cam shaft for varying the speed of the die spindle.

118. In a metal working machine, the combination of a rotary cylinder, a sliding tool carrier having one end thereof non-rotatably but slidingly supported by said cylinder, a cam shaft, means thereon for indexing the cylinder and reciprocating the tool carrier, a threading die spindle slidingly supported on said sliding tool carrier, means for rotating said die spindle, a work spindle shaft, means for rotating the die spindle from said work spindle shaft at different speeds, and means operative from the cam shaft for automatically varying the speed of the die spindle.

119. In a metal working machine having a bed provided with a cylinder casing, a rotatable cylinder therein, means for supporting the cylinder in the rear of said casing, a sliding tool carrier having the front end thereof supported by said cylinder and the rear end thereof by said bed, and means for indexing the cylinder and reciprocating the tool carrier.

120. In a metal working machine having a bed provided with a casing, the combination of a rotatable cylinder located in said casing, means for supporting said cylinder rearwardly of the casing and including a rotatable reel supported on the bed, a sliding tool carrier having one end thereof supported by the cylinder, a cam shaft, and means carried thereby for indexing the cylinder and reciprocating the tool slide.

121. In a metal working machine having a bed provided with a cylinder casing, a rotatable cylinder therein, means for supporting the cylinder in the rear of said casing, a sliding tool carrier having the front end thereof supported by said cylinder and the rear end thereof by said bed, means for indexing the cylinder and reciprocating the tool carrier, a rotary die spindle and means supporting said die spindle for sliding movement on the tool slide, and means for rotating said die spindle.

122. In a metal working machine having a bed provided with a casing, the combination of a rotatable cylinder located in said casing, means for supporting said cylinder rearwardly of the casing and including a rotatable reel supported on the bed, a sliding tool carrier having one end thereof supported by the cylinder, a cam shaft, means carried thereby for indexing the cylinder and reciprocating the tool slide, a rotary die spindle means supporting said die spindle for sliding movement on the tool slide, and means for rotating said die spindle.

123. In a metal working machine having a bed, a sliding tool carrier, a cam shaft, a supplemental shaft supported on said bed and flexibly connected with the sliding tool carrier and reciprocated from the cam shaft, a rotatable threading die spindle slidingly supported on said tool carrier, and means for rotating it.

124. In a metal working machine, the combination of a sliding tool carrier, means for supporting it, a cam shaft, a supplemental shaft flexibly connected to said tool carrier, means for supporting it, and a cam on said cam shaft for reciprocating said supplemental shaft and thereby the tool carrier.

125. In a metal working machine, the combination of a sliding tool carrier, means for supporting it, a cam shaft, a supplemental shaft flexibly connected to said tool carrier, means for supporting it, a cam on said cam shaft for reciprocating said supplemental shaft and thereby the tool carrier, a rotatable threading die spindle slidingly supported on said tool carrier, and means for rotating it.

126. In a metal working machine, the combination of a sliding tool carrier, means for supporting it, a cam shaft, a supplemental shaft flexibly connected to said tool carrier, means for supporting it, a cam on said cam shaft for reciprocating said supplemental shaft and thereby the tool carrier, a rotatable threading die spindle slidingly supported on said tool carrier, means for rotating it, and means operative from the cam shaft for varying the speed of the die spindle.

127. In a metal working machine having a rotatable cylinder and a sliding tool carrier, the combination of a threading die spindle supported for sliding movement relatively to said tool carrier and comprising a pair of telescopic members, one a sleeve and the other a spindle, a spindle driving shaft connected with said sleeve, means for rotating said die shaft, and a spring connecting said spindle with said die shaft.

128. In a metal working machine having a rotatable cylinder and a sliding tool carrier, the combination of a threading die spindle supported for sliding movement relatively to said tool carrier and comprising a pair of telescopic members, one a sleeve and the other a spindle, a spindle driving shaft connected with said sleeve, means for rotating said die shaft, and a spring connecting said spindle with said die shaft, said threading die and tool slide having a sliding engagement with each other.

129. In a metal working machine having a rotatable cylinder and a sliding tool carrier, the combination of a threading die spindle supported for sliding movement relatively to said tool carrier and comprising a pair of telescopic members, one a sleeve and the other a spindle, a spindle driving shaft connected with said sleeve, means for rotating said die shaft, and a spring connecting said spindle with said die shaft, said threading die and tool slide having a sliding engagement with each other, and a rotatable cylinder and means for indexing it, said tool slide having one end thereof supported by said cylinder.

130. In an automatic multiple spindle machine, the combination of a rotatable cylinder, a work carrying spindle carried thereby, means for rotating said spindle and including a gear loosely mounted thereon, and a friction clutch for connecting the gear with the spindle and effective to brake the spindle on the disconnection of the gear therewith, and comprising a pair of duplicate clamping rings and means alternately coöperating therewith.

131. In an automatic multiple spindle machine, the combination of a rotatable cylinder, a work carrying spindle carried thereby, means for rotating said spindle and including a gear loosely mounted thereon, a friction clutch for connecting the gear with the spindle and effective to brake the spindle on the disconnection of the gear therewith, and comprising a pair of duplicate clamping rings and means alternately coöperating therewith, a cam shaft and means operative thereby for automatically operating the clutch.

132. In a metal working machine, the combination of a bed having an integral upright cylinder casing, and an integral upright gear carrying housing.

133. In a metal working machine, the combination of a bed having an integral upright cylinder casing, an integral upright gear carrying housing and also having integral depending bearings for a cam shaft.

134. In a metal working machine, the combination of a bed having an integral upright cylinder casing, an integral upright gear carrying housing, integral depending bearings for a cam shaft, and also having below such bearings an integral pan.

135. A metal working machine having an integral bed comprising a pan, a cam shaft supporting bearings, an upright cylinder casing, and a gear housing opposite thereto.

136. In a metal working machine having a cylinder, a tool carrier, one rotatable and the other sliding, and means for operating them, the combination of a cross slide, a cam shaft, means for operating said slide from the cam shaft, and comprising a pair of levers pivotally supported at different points and having elongated slots, and an adjustable fulcrum bolt extending through said slots, one of said levers having connection with the cross slide.

137. In a metal working machine having a bed, a cylinder, a tool carrier, one rotatable and the other sliding, and means for operating them, the combination of a cross slide supported on the bed, means for taking up the play of the slide in different directions, and means for shifting said slide.

138. In a metal working machine having a bed, a cylinder, a tool carrier, one rotatable and the other sliding, and means for operating them, the combination of a cross slide supported on the bed, means for taking up the play of the slide in different directions, and means for shifting said slide, said means for taking up the play comprising tapered gibs.

139. In a metal working machine having a bed, a cylinder, a tool carrier, one rotatable and the other sliding, and means for operating them, the combination of a cross slide, a hexagon bored bushing supported on the bed, a hexagon shaft located in said bushing, a lever connecting said hexagon shaft with the slide, and means for oscillating said shaft.

140. In a metal working machine having a bed, a cylinder, a tool carrier, one rotatable and the other sliding, and means for operating them, the combination of a cross slide, a hexagon bored bushing supported on the bed, a hexagon shaft located in said bushing, a lever connecting said hexagon shaft with the slide, and means for oscillating said shaft and comprising a pair of levers, one pivotally supported on the bed and the other secured to said hexagon shaft, said levers having a pair of elongated slots, and an adjustable fulcrum bolt extending through said slots.

141. In a metal working machine having a bed, a cylinder, a tool carrier, one rotatable and the other sliding, and means for operating them, the combination of a cross slide, a lever connected thereto, a shaft supporting said lever, a pair of levers, one pivoted to the bed and the other to the shaft and having a pair of elongated slots, an adjustable fulcrum bolt extending through said slots, and a cam shaft coöperating with one of said levers for reciprocating the slide.

142. In a metal working machine having a bed, a cylinder, a tool carrier, one rotatable and the other sliding, and means for operating them, the combination of a cross slide, a lever connected thereto, a shaft supporting said lever, a pair of levers, one pivoted to the bed and the other to the shaft and having a pair of elongated slots, an adjustable fulcrum bolt extending through said slots, and a cam shaft coöperating with one of said levers for reciprocating the slide, the organization being such that the movement of the slide may be varied without changing the cam on the cam shaft.

143. In a metal working machine having a bed, a cylinder, a tool carrier, one rotatable and the other sliding, and means for operating them, the combination of a cross slide, a hexagon shaft supported on the bed, a lever connecting said shaft with the slide, a pair of levers, one connected to the shaft and the other pivoted to the bed, said levers having a pair of elongated slots and an adjustable fulcrum bolt projecting through said slots, a cam shaft, and a cam thereon for engaging the lever pivoted to the bed whereby the slide will be reciprocated and whereby by changing the position of the fulcrum bolt the feed of the slide will be regulated without changing the cam on the cam shaft.

144. In a metal working machine having a cylinder, a tool carrier, one rotatable and the other sliding, and means for operating them, the combination of a cross tool slide, a cam shaft, a cam thereon, and means engaged by the cam for shifting said slide and comprising a lever system and means for changing the position of one lever relatively to a companion lever of the system thereby to vary the throw of the slide whereby without changing the length of the cam on the cam shaft the stroke of the slide may be varied.

145. In a metal working machine having a cylinder, a tool carrier, one rotatable and the other sliding, and means for operating them, the combination of a cam shaft having a cam thereon, a cross tool slide, and means connecting the cam with the cross tool slide for shifting the slide and constructed to permit the feed of the slide to be varied without changing the cam on the cam shaft and comprising a plurality of levers adjustable one relatively to another.

146. In a metal working machine having a cylinder, a tool carrier, one rotatable and the other sliding, and means for operating them, the combination of a cylinder supporting casing, a top slide supported thereon, a cam shaft, and means operative from the cam shaft for shifting the top slide and constructed to permit the movement of the top slide to be varied without changing the cam on the cam shaft.

147. In a metal working machine having a cylinder, a tool carrier, one rotatable and the other sliding, and means for operating them, the combination of a tool supporting slide, a cam shaft, a cam thereon, means for operating said slide from the cam of the cam shaft and including means for varying the sliding movement of said slide without changing the cam on the cam shaft and comprising a plurality of levers adjustable one relatively to another.

148. In a metal working machine having a cylinder, a tool carrier, one rotatable and the other sliding, and means for operating them, the combination of a tool supporting slide, a cam shaft, a cam thereon, means for operating said slide from the cam of the cam shaft and including means for varying the sliding movement of said slide without changing the cam on the cam shaft, said means comprising a pair of levers and an adjustable fulcrum bolt connecting said levers.

149. In a metal working machine having a bed, a cylinder, a tool carrier, one rotatable and the other sliding, and means for operating them, the combination of a pair of cross tool slides supported on the bed, a cam shaft, a cam thereon, and means for operating said slides from the cam shaft and including means for varying the sliding movement of said slides without changing the cam on the cam shaft and comprising two sets of levers, each set having its levers adjustable relatively one to another.

150. In a metal working machine having a bed, a cylinder, a tool carrier, one rotatable and the other sliding, and means for operating them, the combination of a pair of cross tool slides supported on the bed, a cam shaft, a cam thereon, and means for operating said slides from the cam shaft and including means for varying the sliding movement of said slides without changing the cam on the cam shaft and comprising a duplicate pair of levers, and an adjustable fulcrum connecting the levers of each pair.

151. In a metal working machine having a bed, a cylinder, a tool carrier, one rotatable and the other sliding, and means for operating them, the combination of a pair of cross tool slides supported on the bed, a cam shaft, a cam thereon, and means for operating said slides from the cam shaft and including means for varying the sliding movement of said slides without changing the cam on the cam shaft and comprising a duplicate pair of levers and an adjustable fulcrum connecting the levers of each pair, one lever of each pair pivotally supported by the bed and coöperating with the cam and the other secured to a shaft supported by the bed, and a lever connecting said shaft with its cross slide.

152. In a metal working machine having a bed, a cylinder, a tool carrier, one rotatable and the other sliding, and means for operating them, the combination of a pair of cross tool slides supported on the bed, a cam shaft, a cam thereon, and means for operating said slides from the cam shaft and including means for varying the sliding movement of said slides without changing the cam on the cam shaft and comprising a duplicate pair of levers and an adjustable fulcrum connecting the levers of each pair, one lever of each pair pivotally supported by the bed and coöperating with the cam and the other secured to a shaft supported by the bed, and a lever connecting said shaft with its cross slide, said shaft having a hexagon formation.

153. In a metal working machine having a bed, a cylinder, a tool carrier, one rotatable and the other sliding, and means for operating them, the combination of a pair of cross tool slides supported on the bed, a cam shaft, a cam thereon, means for operating said slides from the cam shaft and including means for varying the sliding movement of said slides without changing the cam on the cam shaft and comprising a duplicate pair of levers and an adjustable fulcrum connecting the levers of each pair, one lever of each pair pivotally supported by the bed and coöperating with the cam and the other secured to a shaft supported by the bed, and a lever connecting said shaft with its cross slide, said shaft having a hexagon formation, and a hexagon bored bushing for supporting said shaft.

154. In a metal working machine having a cylinder, a tool carrier, one rotatable and the other sliding, and means for operating them, the combination with a cylinder casing, of a top slide supported thereby, a cross slide supported below the same, a cam shaft, a cam thereon, means operated by the cam shaft for shifting the cross slide, and means connected with said last means for shifting the top slide.

155. In a metal working machine having a cylinder, a tool carrier, one rotatable and the other sliding, and means for operating them, the combination with a cylinder casing, of a top slide supported thereby, a cross slide supported below the same, a cam shaft, a cam thereon, means operated by the cam shaft for shifting the cross slide, and means connected with said last means for shifting the top slide and comprising a pair of levers having elongated slots, an adjustable fulcrum bolt extending through said slots whereby the shiftable movement of said slides may be varied without changing the cam on the cam shaft.

156. In a metal working machine having a cylinder, a tool carrier, one rotatable and the other sliding, and means for operating them, the combination with a cylinder casing, of a top slide supported thereby, a cross slide supported below the same, a cam shaft, a cam thereon, means operated by the cam shaft for shifting the cross slide, and means connected with said last means for shifting the top slide and comprising a pair of levers having elongated slots, an adjustable fulcrum bolt extending through said slots whereby the shiftable movement of said slides may be varied without changing the cam on the cam shaft, one of said levers pivotally supported to the bed of the machine and the other carried by a shaft connected with said cross slide.

157. In a metal working machine having a bed, a cylinder, a tool carrier, one rotatable and the other sliding, means for operating them, and a cylinder casing, the combination of a cross slide supported on the bed, a top slide supported on the casing, a shaft carried by the bed, a lever connecting the cross slide with the shaft, a depending lever also connected with the shaft, a lever pivotally secured to the bed, said last two levers having elongated slots for the reception of an adjustable fulcrum bolt, means for operating said levers to shift the cross slide, and a connection from said shaft to the top slide whereby the top and cross slides are operated by the same means.

158. In a metal working machine having a bed, a cylinder, a tool carrier, one rotatable and the other sliding, means for operating them, and a cylinder casing, the combination of a cross slide supported on the bed, a top slide supported on the casing, a shaft carried by the bed, a lever connecting the cross slide with the shaft, a depending lever also connected with the shaft, a lever pivotally secured to the bed, said last two levers having elongated slots for the reception of an adjustable fulcrum bolt, means for operating said levers to shift the cross slide, and a connection from said shaft to the top slide whereby the top and cross slides are operated by the same means, said connection having an adjustment relatively to the top slide.

159. In a metal working machine having a bed, a cylinder, a tool carrier, one rotatable and the other sliding, means for operating them, and a cylinder casing, a pair of cross slides supported on the bed, a pair of top slides supported on the casing, a cam shaft having a cam thereon, and duplicate means for operating said cross slides and top slides, each of said duplicate means consisting of a pair of levers connected with the cross slide and with the bed and operative by the cam and having an adjustable fulcrum bolt, and means connecting the cross slide and the top slide.

160. In a metal working machine having a bed, a cylinder, a tool carrier, one rotatable and the other sliding, means for operating them, and a cylinder casing, a pair of cross slides supported on the bed, a pair of top slides supported on the casing, a cam shaft having a cam thereon and duplicate means for operating said cross slides and top slides, each of said duplicate means consisting of a pair of levers connected with the cross slide and with the bed and operative by the cam and having an adjustable fulcrum bolt, means connecting the cross slide and the top slide, and a hexagon shaft connecting one of said levers and to which the cross slide is connected and to which also the top slide is connected.

161. In a metal working machine, the combination of a rotatable work carrying cylinder, a plurality of rotatable work spindles carried thereby, a sliding tool carrier, means for indexing the cylinder and reciprocating the tool carrier, means for stopping the work carrying spindles successively as they are indexed into a predetermined position, a threading die spindle shiftable independently of the tool slide, and means for rotating it.

162. In a metal working machine, the combination of a rotatable work carrying cylinder, a plurality of rotatable work spindles carried thereby, a sliding tool carrier, means for indexing the cylinder and reciprocating the tool carrier, means for stopping the work carrying spindles successively as they are indexed into a predetermined position, a threading die spindle shiftable independently of the tool slide, and means for rotating it, said threading die spindle having a sliding support on the tool carrier.

163. In a metal working machine, the combination of a rotatable work carrying cylinder, a plurality of rotatable work spindles carried thereby, a sliding tool carrier, means for indexing the cylinder and reciprocating the tool carrier, means for stopping the work carrying spindles successively as they are indexed into a predetermined position, a threading die spindle shiftable independently of the tool slide, means for rotating it, said threading die spindle having a sliding support on the tool carrier, and said tool carrier having one end thereof projecting into the cylinder.

164. In a metal working machine, the combination of a cam shaft, a rotatable cylinder, means for indexing the cylinder from the cam shaft, means for supporting the cylinder rearwardly thereof, a reciprocating tool slide having a part of the supporting means therefor projecting into the cylinder, means for reciprocating the tool slide from the cam shaft without imparting to the tool slide the strain of such reciprocating means, one or more side tool slides, means including a cam on the cam shaft for shifting each of the side tool slides and changeable to vary the movement of each of the slides without changing said cam, means for feeding the stock through the cylinder, means including a cam on the cam shaft for shifting said stock feeding means and changeable to vary the feeding movement thereof without changing the cam on the cam shaft, means for rotating the cam shaft and including a worm wheel, and safety mechanism connecting said worm wheel with the cam shaft.

165. In a metal working machine, the combination of a cam shaft, a rotatable cylinder, means for indexing the cylinder from the cam shaft, means for supporting the cylinder rearwardly thereof, a reciprocating tool slide having a part of the supporting means therefor projecting into the cylinder, means for reciprocating the tool slide from the cam shaft without imparting to the tool slide the strain of such reciprocating means, one or more side tool slides, means including a cam on the cam shaft for shifting each of the side tool slides and changeable to vary the movement of each of the slides without changing said cam, means for feeding the stock through the cylinder, means including a cam on the cam shaft for shifting said stock feeding means and changeable to vary the feeding movement thereof without changing the cam on the cam shaft, means for rotating the cam shaft and including a worm wheel, safety mechanism connecting said worm wheel with the cam shaft, an auxiliary spindle supported for sliding movement on and relatively to the tool slide and means for rotating it.

166. In a metal working machine, the combination of a cam shaft, a rotatable cylinder, means for indexing the cylinder from the cam shaft, means for supporting the cylinder rearwardly thereof and including a rotatable stock reel, a reciprocating tool slide having a part of the supporting means therefor projecting into the cylinder, means for reciprocating the tool slide from the cam shaft without imparting to the tool slide the strain of such reciprocating means, one or more side tool slides, means including a cam on the cam shaft for shifting each of the side tool slides and changeable to vary the movement of each of the slides without changing said cam, means for feeding the stock through the cylinder, means including a cam on the cam shaft for shifting said stock feeding means and changeable to vary the feeding movement thereof without changing the cam on the cam shaft, means for rotating the cam shaft and including a worm wheel, and safety mechanism connecting said worm wheel with the cam shaft.

167. In a metal working machine, the combination of a rotatable cylinder, means for indexing the cylinder, a reciprocating tool slide, and means for reciprocating the tool slide without imparting thereto the strain of such reciprocating means.

168. In a metal working machine, the combination of a rotatable cylinder, means for indexing the cylinder, a reciprocating tool slide, means for reciprocating the tool slide, one or more side tool slides, a cam shaft, means including a cam on the cam shaft and a plurality of relatively adjustable levers for each side tool slide for shifting each of the tool slides and changeable to vary the movement of each of the slides without changing said cam.

169. In a metal working machine, the combination of a rotatable cylinder, means for indexing the cylinder, a reciprocating tool slide, means for reciprocating the tool slide, means for feeding the stock through the cylinder, a cam shaft, means including a cam on the cam shaft for shifting said stock feeding means and changeable to vary the feeding movement thereof without changing the cam on the cam shaft and comprising a slide and a plurality of crosswise extending horizontally located adjustably connected levers connected with such slide.

170. In a metal working machine, the combination of a rotatable cylinder, a reciprocating tool slide, a cam shaft, means thereon for indexing the cylinder, means thereon for reciprocating the tool slide without imparting to the tool slide the strain of such reciprocating means, one or more side working tool slides, and means including a cam on the cam shaft for shifting each of the latter tool slides and changeable to vary the movement of each of the latter slides without changing said cam.

171. In a metal working machine, the combination of a rotatable cylinder, a reciprocating tool slide, a cam shaft, means thereon for indexing the cylinder, means thereon for reciprocating the tool slide without imparting to the tool slide the strain of such reciprocating means, one or more side working tool slides, means including a cam on the cam shaft for shifting each of the latter tool slides and changeable to vary the movement of each of the latter slides without changing said cam, means for feeding the stock through the cylinder, and means including a cam on the cam shaft for shifting said stock feeding means and changeable to vary the feeding movement thereof without changing the cam on the cam shaft.

172. In a metal working machine, the combination of a rotatable cylinder, a reciprocating tool slide, a cam shaft, means thereon for indexing the cylinder, means thereon for reciprocating the tool slide without imparting to the tool slide the strain of such reciprocating means, one or more tool slides, means including a cam on the cam shaft for shifting each of the tool slides and changeable to vary the movement of each of the slides without changing said cam, means for feeding the stock through the cylinder, means including a cam on the cam shaft for shifting said stock feeding means and changeable to vary the feeding movement thereof without changing the cam on the cam shaft, and means for rotating the cam shaft and including means carried by the cam shaft and having safety mechanism connecting it with the cam shaft.

173. In a metal working machine, the combination of a cam shaft, a rotatable cylinder, means for indexing the cylinder from the cam shaft, means for supporting the cylinder rearwardly thereof and including a stock reel rotatable therewith, a reciprocating tool slide having a part thereof projecting into and non-rotatable with the cylinder and also having a part thereof slidingly supported by the bed of the machine, means for reciprocating the tool slide from the cam shaft without imparting to the tool slide the strain of such reciprocating means and including an intermediate sliding member, a plurality of side tool slides comprising one or more cross slides and one or more top slides, and means including a cam on the cam shaft for shifting the slides and changeable to vary the movement of the slides without changing said cam.

174. In a metal working machine, the combination of a cam shaft, a rotatable cylinder, means for indexing the cylinder from the cam shaft, means for supporting the cylinder rearwardly thereof and including a stock reel rotatable therewith, a reciprocating tool slide having a part thereof projecting into and non-rotatable with the cylinder and also having a part thereof slidingly supported by the bed of the machine, means for reciprocating the tool slide from the cam shaft without imparting to the tool slide the strain of such reciprocating means and including an intermediate sliding member, a plurality of side tool slides comprising one or more cross slides and one or more top slides, means including a cam on the cam shaft for shifting the slides and changeable to vary the movement of the slides without changing said cam, means for feeding the stock through the cylinder, and means including a cam on the cam shaft for shifting said stock feeding means and changeable to vary the feeding movement thereof without changing the cam on the cam shaft.

175. In a metal working machine, the combination of a cam shaft, a rotatable cylinder, means for indexing the cylinder from the cam shaft, means for supporting the cylinder rearwardly thereof and including a stock reel rotatable therewith, a reciprocating tool slide having a part thereof projecting into and non-rotatable with the cylinder and also having a part thereof slidingly supported by the bed of the machine, means for reciprocating the tool slide from the cam shaft without imparting to the tool slide the strain of such reciprocating means and including an intermediate sliding member, a plurality of side tool slides comprising one or more cross slides and one or more top slides, means including a cam on the cam shaft for shifting the slides and changeable to vary the movement of the slides without changing said cam, means for feeding the stock through the cylinder, means including a cam on the cam shaft for shifting said stock feeding means and changeable to vary the feeding movement thereof without changing the cam on the cam shaft, means for rotating the cam shaft and including means carried thereby provided with safety mechanism connecting it with the cam shaft.

176. In a metal working machine, the combination of a cam shaft, a rotatable cylinder, means for indexing the cylinder from the cam shaft, means for supporting the cylinder rearwardly thereof and including a stock reel rotatable therewith, a reciprocating tool slide having a part thereof projecting into and non-rotatable with the cylinder and also having a part thereof slidingly supported by the bed of the machine, means for reciprocating the tool slide from the cam shaft without imparting to the tool slide the strain of such reciprocating means, and including an intermediate sliding member, a plurality of side tool slides comprising one or more cross slides and one or more top slides, means including a cam on the cam shaft for shifting the slides and changeable to vary the movement of the slides without changing said cam, means for feeding the stock through the cylinder, means including a cam on the cam shaft for shifting said stock feeding means and changeable to vary the feeding movement thereof without changing the cam on the cam shaft, means for rotating the cam shaft at different speeds and for automatically changing the speed of such rotation.

177. In a metal working machine, the combination of a cam shaft, a rotatable cylinder, means for indexing the cylinder from the cam shaft, means for supporting the cylinder rearwardly thereof and including a stock reel rotatable therewith, a reciprocating tool slide having a part thereof projecting into and non-rotatable with the cylinder and also having a part thereof slidingly supported by the bed of the machine, means for reciprocating the tool slide from the cam shaft without imparting to the tool slide the strain of such reciprocating means and including an intermediate sliding member, a plurality of side tool slides comprising one or more cross slides and one or more top slides, means including a cam on the cam shaft for shifting the slides and changeable to vary the movement of the slides without changing said cam, means for feeding the stock through the cylinder, means including a cam on the cam shaft for shifting said stock feeding means and changeable to vary the feeding movement thereof without changing the cam on the cam shaft, means for rotating the cam shaft at different speeds and for automatically changing the speed of such rotation, said cam shaft rotating means including means carried by the cam shaft and connected therewith by a safety mechanism.

178. In a metal working machine, the combination of a cam shaft, a rotatable cylinder, means for indexing the cylinder from the cam shaft, means for supporting the cylinder rearwardly thereof and including a stock reel rotatable therewith, a reciprocating tool slide having a part thereof projecting into and non-rotatable with the cylinder and also having a part thereof slidingly supported by the bed of the machine, means for reciprocating the tool slide from the cam shaft without imparting to the tool slide the strain of such reciprocating means and including an intermediate sliding member, a plurality of side tool slides comprising one or more cross slides and one or more top slides, means including a cam on the cam shaft for shifting the slides and changeable to vary the movement of the slides without changing said cam, means for feeding the stock through the cylinder, means including a cam on the cam shaft for shifting said stock feeding means and changeable to vary the feeding movement thereof without changing the cam on the cam shaft, means for rotating the cam shaft at different speeds and for automatically changing the speed of such rotation, said cam shaft rotating means including means carried by the cam shaft and connected therewith by a safety mechanism, an auxiliary spindle supported for sliding movement on and relatively to the tool slide, and means for rotating it.

179. In a metal working machine, the combination of a cam shaft, a rotatable cylinder, means for indexing the cylinder from the cam shaft, means for supporting the cylinder rearwardly thereof and including a stock reel rotatable therewith, a reciprocating tool slide having a part thereof projecting into and non-rotatable with the cylinder and also having a part thereof slidingly supported by the bed of the machine, means for reciprocating the tool slide from the cam shaft without imparting to the tool slide the strain of such reciprocating means and including an intermediate sliding member, a plurality of side tool slides comprising one or more cross slides and one or more top slides, means including a cam on the cam shaft for shifting the slides and changeable to vary the movement of the slides without changing said cam, means for feeding the stock through the cylinder, means including a cam on the cam shaft for shifting said stock feeding means and changeable to vary the feeding movement thereof without changing the cam on the cam shaft, means for rotating the cam shaft at different speeds and for automatically changing the speed of such rotation, said cam shaft rotating means including means carried by the cam shaft and connected therewith by a safety mechanism, an auxiliary spindle supported for sliding movement on and relatively to the tool slide, means for rotating it at different speeds, and means connected with the cam shaft for automatically varying the speed of said spindle.

180. In a metal working machine, the combination of a cam shaft, a rotatable cylinder, means for indexing the cylinder from the cam shaft, means for supporting the cylinder rearwardly thereof and including a stock reel rotatable therewith, a reciprocating tool slide having a part thereof projecting into and non-rotatable with the cylinder and also having a part thereof slidingly supported by the bed of the machine, means for reciprocating the tool slide from the cam shaft without imparting to the tool slide the strain of such reciprocating means and including an intermediate sliding member, a plurality of side tool slides comprising one or more cross slides and one or more top slides, means including a cam on the cam shaft for shifting the slides and changeable to vary the movement of the slides without changing said cam, means for feeding the stock through the cylinder, means including a cam on the cam shaft for shifting said stock feeding means and changeable to vary the feeding movement thereof without changing the cam on the cam shaft, means for rotating the cam shaft at different speeds and for automatically changing the speed of such rotation, said cam shaft rotating means including means carried by the cam shaft and connected therewith by a safety mechanism, an auxiliary spindle supported for sliding movement on and relatively to the tool slide, means for rotating it at different speeds, means connected with the cam shaft for automatically varying the speed of said spindle, and an oscillatory stock stop located in front of the cylinder and actuated by the came shaft.

181. In a metal working machine, the combination of a cam shaft, a rotatable cylinder, means for indexing the cylinder from the cam shaft, means for supporting the cylinder rearwardly thereof and including a stock reel rotatable therewith, a reciprocating tool slide having a part thereof projecting into and non-rotatable with the cylinder and also having a part thereof slidingly supported by the bed of the machine, means for reciprocating the tool slide from the cam shaft without imparting to the tool slide the strain of such reciprocating means and including an intermediate sliding member, a plurality of side tool slides comprising one or more cross slides and one or more top slides, means including a cam on the cam shaft for shifting the slides and changeable to vary the movement of the slides without changing said cam, means for feeding the stock through the cylinder, means including a cam on the cam shaft for shifting said stock feeding means and changeable to vary the feeding movement thereof without changing the cam on the cam shaft, means for rotating the cam shaft at different speeds and for automatically changing the speed of such rotation, said cam shaft rotating means including means carried by the cam shaft and connected therewith by a safety mechanism, an auxiliary spindle supported for sliding movement on and relatively to the tool slide, means for rotating it at different speeds, means connected with the cam shaft for automatically varying the speed of said spindle, an oscillatory stock stop located in front of the cylinder and actuated by the cam shaft, a plurality of work spindles carried by the cylinder, means for rotating them, and means for stopping each of said spindles successively as they are rotated into position by the cylinder.

182. In a metal working machine, the combination of a cam shaft, a rotatable cylinder, means for indexing the cylinder from the cam shaft, means for supporting the cylinder rearwardly thereof and including a stock reel rotatable therewith, a reciprocating tool slide having a part thereof projecting into and non-rotatable with the cylinder and also having a part thereof slidingly supported by the bed of the machine, means for reciprocating the tool slide from the cam shaft without imparting to the tool slide the strain of such reciprocating means and including an intermediate sliding member, a plurality of side tool slides comprising one or more cross slides and one or more top slides, means including a cam on the cam shaft for shifting the slides and changeable to vary the movement of the slides without changing said cam, means for feeding the stock through the cylinder, means including a cam on the cam shaft for shifting said stock feeding means and changeable to vary the feeding movement thereof without changing the cam on the cam shaft, means for rotating the cam shaft at different speeds and for automatically changing the speed of such rotation, said cam shaft rotating means including means carried by the cam shaft and connected therewith by a safety mechanism, an auxiliary spindle supported for sliding movement on and relatively to the tool slide, means for rotating it at different speeds, means connected with the cam shaft for automatically varying the speed of said spindle, an oscillatory stock stop located in front of the cylinder and actuated by the cam shaft, a plurality of work spindles carried by the cylinder, means for rotating them, means for stopping each of said spindles successively as they are rotated into position by the cylinder, and a positively acting locking means for locking the cylinder in each of its indexed positions.

183. In a metal working machine, the combination of a rotatable cylinder, a reciprocating tool slide, a cam shaft, means for reciprocating the tool slide from the cam shaft without imparting to the tool slide the strain of such reciprocating means, and means for rotating the cam shaft at different speeds and including automatically operative means for varying the speed of the cam shaft.

184. In a metal working machine, the combination of a rotatable cylinder, a reciprocating tool slide, one or more side tool slides, a cam shaft, means carried thereby for indexing the cylinder and reciprocating the tool slide, means including a cam on the cam shaft for shifting each of the said side tool slides and changeable to vary the movement of each of the said tool slides without changing said cam, and means for rotating the cam shaft at different speeds and including means automatically operative to vary the speed of the cam shaft.

185. In a metal working machine, the combination of a rotatable cylinder, a reciprocating tool slide, a cam shaft, means carried thereby for indexing the cylinder and reciprocating the tool slide, means for feeding the stock through the cylinder, means including a cam on the cam shaft for shifting said stock feeding means and changeable to vary the feeding movement thereof without changing the cam on the cam shaft, and means for rotating the cam shaft at different speeds and including means for automatically varying the speed of the cam shaft.

186. In a metal working machine, the combination of a rotatable cylinder, means for supporting it rearwardly thereof and including a rotatable stock reel connected to the cylinder for rotation therewith, a reciprocating tool slide having a part thereof projecting into the cylinder and a part thereof supported by the bed of the machine, a cam shaft, means for indexing the cylinder, means for reciprocating the tool slide from the cam shaft without imparting to the tool slide the strain of such reciprocating means, one or more side tool slides, means including a cam on the cam shaft for shifting each of the said tool slides and changeable to vary the movement of each of the slides without changing said cam, means for feeding the stock through the cylinder, means including a cam on the cam shaft for shifting said stock feeding means and changeable to vary the feeding movement thereof without changing the cam on the cam shaft, means for rotating the cam shaft at different speeds and including a safety mechanism, and means for automatically varying the speed of the cam shaft.

Signed at Cleveland, Cuyahoga county, Ohio, this 17th day of January, 1917, and at Windsor, Vermont this 19th day of January 1917.

ALFRED E. DRISSNER.
FREDERICK P. GLOSH.
EDWIN C. HENN.
OSCAR A. SMITH.
ROBERT STERN.

Witnesses:
A. W. HOPKINS,
E. J. MASTERSON.